(12) United States Patent
Hanahan et al.

(10) Patent No.: US 11,711,317 B1
(45) Date of Patent: *Jul. 25, 2023

(54) REMOTE PORT FOR NETWORK CONNECTIVITY FOR NON-COLOCATED CUSTOMERS OF A CLOUD EXCHANGE

(71) Applicant: Equinix, Inc., Redwood City, CA (US)

(72) Inventors: John Brant Hanahan, Saratoga, CA (US); Muhammad Durrani, San Jose, CA (US); Vikrant Yadav, Sunnyvale, CA (US); Sathish Chandra Sanga, Sunnyvale, CA (US)

(73) Assignee: EQUINIX, INC., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/645,113

(22) Filed: Dec. 20, 2021

Related U.S. Application Data

(63) Continuation of application No. 17/138,469, filed on Dec. 30, 2020, now Pat. No. 11,218,424.

(51) Int. Cl.
| | |
|---|---|
| *H04L 47/21* | (2022.01) |
| *H04L 47/70* | (2022.01) |
| *H04L 67/00* | (2022.01) |
| *H04L 47/74* | (2022.01) |
| *H04L 67/01* | (2022.01) |

(52) U.S. Cl.
CPC .......... *H04L 47/827* (2013.01); *H04L 47/745* (2013.01); *H04L 47/821* (2013.01); *H04L 47/825* (2013.01); *H04L 67/01* (2022.05); *H04L 67/34* (2013.01)

(58) Field of Classification Search
CPC ...... H04L 47/827; H04L 67/01; H04L 47/745
See application file for complete search history.

(56) References Cited

U.S. PATENT DOCUMENTS

| | | |
|---|---|---|
| 9,886,267 B2 | 2/2018 | Maheshwari et al. |
| 9,948,552 B2 | 4/2018 | Teng et al. |
| 10,129,078 B2 | 11/2018 | Kumar et al. |
| 10,893,022 B1 | 1/2021 | Li et al. |

(Continued)

OTHER PUBLICATIONS

Rosen et al., "BGP/MPLS IP Virtual Private Networks (VPNs)," Network Working Group, RFC 4364, Feb. 2006, 48 pp.

(Continued)

*Primary Examiner* — Adnan M Mirza
(74) *Attorney, Agent, or Firm* — Shumaker & Sieffert, P.A.

(57) ABSTRACT

In general, techniques are described for network connectivity for non-colocated customers of a cloud exchange. A programmable network platform for the cloud exchange comprises processing circuitry configured to: configure a virtual network device in the data center to run a network service for a customer; receive, from the customer, a request for a remote port and network information for a network service provider connectivity service for the customer; assign, in response to receiving the request for the remote port, a remote port of the cloud exchange to the customer; and configure, in response to receiving the request for the remote port using the network information, the cloud exchange to connect the network service provider connectivity service to the virtual network device via the remote port of the cloud exchange.

20 Claims, 18 Drawing Sheets

(56) References Cited

U.S. PATENT DOCUMENTS

| | | | |
|---|---|---|---|
| 2013/0066940 A1* | 3/2013 | Shao | H04L 67/1025 |
| | | | 709/201 |
| 2015/0112944 A1* | 4/2015 | Wu | G06F 11/2097 |
| | | | 707/652 |
| 2016/0197843 A1 | 7/2016 | Palan et al. | |
| 2020/0304423 A1 | 9/2020 | Sodagar et al. | |

OTHER PUBLICATIONS

U.S. Appl. No. 17/019,001, filed Sep. 11, 2020, naming inventors Kempf et al.

Prosecution History from U.S. Appl. No. 17/138,469, dated May 11, 2021 through August Aug. 26, 2021, 28 pp.

* cited by examiner

REMOTE PORT FOR NETWORK CONNECTIVITY FOR NON-COLOCATED CUSTOMERS OF A CLOUD EXCHANGE

This application is a continuation of U.S. patent application Ser. No. 17/138,469, filed 30 Dec. 2020, the entire contents of which is incorporated herein by reference.

TECHNICAL FIELD

The disclosure relates to computer networks and, more specifically, to cloud exchanges for connecting customers and cloud service providers.

BACKGROUND

Cloud computing refers to the use of dynamically scalable computing resources accessible via a network, such as the Internet. The computing resources, often referred to as a "cloud," provide one or more services to users. These services may be categorized according to service types, which may include for examples, applications/software, platforms, infrastructure, virtualization, and servers and data storage. The names of service types are often prepended to the phrase "as-a-Service" such that the delivery of applications/software and infrastructure, as examples, may be referred to as Software-as-a-Service (SaaS), Platform-as-a-Service (PaaS), and Infrastructure-as-a-Service (IaaS), respectively.

The term "cloud-based services" or, more simply, "cloud services" refers not only to services provided by a cloud, but also to a form of service provisioning in which cloud customers contract with cloud service providers for the online delivery of services provided by the cloud. Cloud service providers manage a public, private, or hybrid cloud to facilitate the online delivery of cloud services to one or more cloud customers.

A data center provider may employ a facility, such as a data center or warehouse, in which multiple customers of the provider offer connections and/or locate network, server, and storage gear and interconnect to a variety of telecommunications, cloud, and other network service provider(s) with a minimum of cost and complexity. Such data centers may be shared by the multiple customers. By interconnecting at such facilities, the customers of the provider including telecommunications providers, Internet Service Providers (ISPs), application service providers, service providers, content providers, and other providers, as well as enterprises, enjoy less latency and the freedom to focus on their core business.

A network operator, such as the data center provider, may provide network functions that can be applied to packets traversing a switching fabric of the data center that is managed by the data center provider. The network functions may be implemented using specialized hardware appliances, such as firewalls or routers and sometimes referred to as Physical Network Functions (PNFs), or implemented using a Network Functions Virtualization (NFV) architecture or infrastructure (NFVI) that may include Virtualized Network Functions (VNFs). A network function (PNF or VNF) may provide firewall, routing, carrier grade network address translation (CG-NAT), performance enhancement proxies for video, transport control protocol (TCP) optimization and header enrichment, caching, load balancing, or other network functions, for example. A VNF may be executed by one or more virtual machines, containers, or other execution environment of the NFV Infrastructure. In this way, virtualized network functions may be executed by servers, switches, storage devices, and cloud computing infrastructure.

SUMMARY

The present disclosure describes techniques for enabling network service provider-based connectivity from customer networks and associated devices (e.g., end-user devices) to virtualized network functions for a cloud exchange customer that does not co-locate equipment in the data center. For example, a data center provider, for a data center that includes a cloud exchange may deploy NFVI to the physical data center environment to execute network services for customer traffic of customers of the data center provider. These network services may be VNFs owned or leased by the customers. A customer may request, and have reserved, a remote hardware port ("remote port") that is connected to the NFVI to give the customer a "physical presence" in the data center where the customer does not otherwise colocate equipment (i.e., is not colocated in the data center). The cloud exchange provider can provision a real or virtual connection between the remote port and a network service provider (NSP) port for NSP equipment co-located in the data center. This NSP port may itself be an interface for an NSP connection created by the NSP for the customer. As a result, the remote port and the NSP connection for the customer provides external access by which customer branch offices or other customer networks, external to the data center, can exchange customer traffic with the NFVI for application of network services despite the customer not having physical equipment within the data center or obtaining external network connectivity from the cloud exchange provider.

The techniques described herein provide one or more technical advantages that present at least one practical application. For example, the techniques may address systems in which external connectivity is provided by the cloud exchange provider through a pre-selected NSP. This requires customers to purchase the NSP connection from the cloud exchange provider and does not permit the customer to benefit from an existing NSP connection enabling connectivity for the external customer networks. To overcome these limitations, the present disclosure describes techniques, including systems and workflows, that confer to the customer automated control over which network service provider to use for connecting the customer services and external customer networks.

The customer may therefore avail itself of the freedom to obtain network connectivity from any NSP that brings connectivity into the data center. The customer may further benefit from exclusive use of one NSP or a few NSPs, in effect integrating the NSP(s) into the customer's network. As one advantage, the NSP's backbone becomes the backbone for the customer's network. As another advantage, the data center may automate an ordering process for connections to the NSP port. The customer benefits from automated procurement of a requested NSP connectivity service. To illustrate a smooth acquisition of the requested service on the customer's behalf, the cloud exchange provider may automatically authorize the customer's order information for that connectivity service in response to the customer's request for a connection (e.g., interconnection) to a specific NSP. Based on information (e.g., network information) in the customer's request, the data center accepts and executes the connection order unless the request's information is invalid. If the customer also is a customer of the NSP, the cloud exchange provider may automatically connect the remote port with the requested NSP connection at the NSP port for the NSP connection, thereby providing the customer's VNFs on the data center NFVI with immediate external (e.g., Internet and/or virtual private network (VPN)) connectivity.

In one example, a computing system for one or more cloud exchanges is described. The computing system comprises processing circuitry coupled to a memory; and a programmable network platform stored in the memory and configured for execution by the processing circuitry, wherein the processing circuitry is operative to: configure a virtual network device in the data center to run a network service for a customer; receive, from the customer, a request for a remote port and network information for a network service provider connectivity service for the customer; assign, in response to receiving the request for the remote port, a remote port of the cloud exchange to the customer; and configure, in response to receiving the request for the remote port using the network information, the cloud exchange to connect the network service provider connectivity service to the virtual network device via the remote port of the cloud exchange.

In one example, a method of a computing system operated by a data center provider for a data center is described. The computing system comprising a programmable network platform for a cloud exchange operating within a data center. The method performed by the programmable network platform, the method comprises: configuring, by processing circuitry, a virtual network device in the data center to run a network service for a customer; from the customer, receiving, by the processing circuitry, a request for a network service provider connectivity service, the request comprising network information for a network service provider corresponding to the network service provider connectivity service; assigning, in response to receiving the request, a remote port of the cloud exchange to the virtual network device of the customer; and in response to receiving the request for the remote port using the network information, configuring, by the processing circuitry, the cloud exchange to connect the network service provider connectivity service to the virtual network device via the remote port of the cloud exchange.

In one example, a non-transitory computer-readable medium comprising executable instructions, that when executed by processing circuitry, cause a computing device to: A non-transitory computer-readable medium comprising executable instructions, that when executed by processing circuitry, cause a computing device to: configure a virtual network device in the data center to run a network service for a customer; from the customer, receive a request for a network service provider connectivity service, the request comprising network information for a network service provider corresponding to the network service provider connectivity service; in response to receiving the request, assign a remote port of the cloud exchange to the virtual network device of the customer; and in response to receiving the request for the remote port using the network information, configure the cloud exchange to connect the network service provider connectivity service to the virtual network device via the remote port of the cloud exchange.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

The present disclosure is applicable when an entity desires network connectivity and control over its network connectivity options. If the entity prioritizes one particular network service provider (e.g., Internet Service Provider (ISP)) above others (e.g., because of a pre-existing advantageous relationship), the present disclosure describes techniques that connect the entity's external network to that particular service provider. Techniques other than those described herein cannot ensure the computer network is able to connect with a desired network service provider unless that network service provider is migrated and setup in a same data center as a computer network or the entity purchases, from a data center provider, a service connecting the entity's network to the network service provider's network infrastructure and resources (e.g., Internet or Cloud services).

If the entity has a pre-existing connection to the network service provider, the data center provider service mentioned above would be a separate connection to the same network and an example of redundant network service provider connectivity. To use the data center for network services and the particular network service provider for connectivity, the entity would have to be a data center provider customer and expend time and resources for a extraneous connection. The data center provider may lose the entity as a customer if the expenditures are prohibitive. The techniques described herein save the entity substantial time and resources by enabling the entity to leverage the pre-existing relationship with the network service provider while maintaining a virtual network with the data center provider.

By implementing the present disclosure, the customer no longer has to maintain a physical presence in the data center to purchase a NSP connection through a cloud exchange platform. Instead, the cloud exchange platform can reserve a remote port (e.g., as a virtual access port) for the customer to interconnect with the NSP's physical presence. In this manner, the customer can leverage a pre-existing relationship with an NSP to control its network traffic. Most (if not all) network traffic between the customer's branch office is handled by the same NSP, simplifying the customer's network management.

In some examples, a customer network may desire to use a specific network service provider to handle their network traffic with other networks and while availing the cloud exchanges to direct outgoing packets to computing systems hosted by cloud service providers or other providers. In addition to the above, the present disclosure describes a number of benefits and advantages to implementing the techniques described herein. For at least these reasons, the cloud exchange of the described techniques constitutes a technological improvement or a practical application of a solution to a technical problem.

Figure 1:
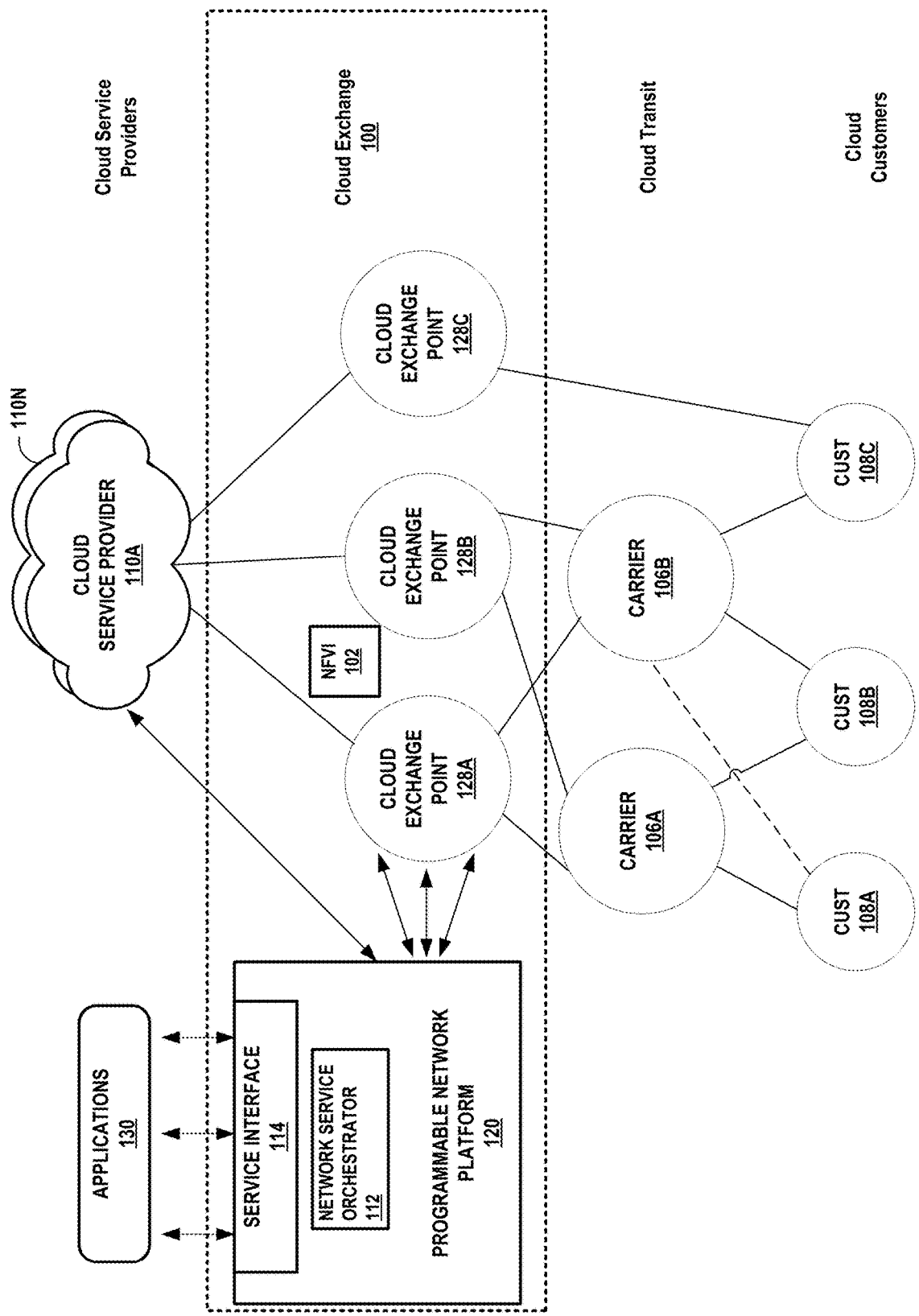
FIG. 1 is a block diagram that illustrates a conceptual view of a network system having a metro-based cloud exchange that provides multiple cloud exchange points according to techniques described herein.

FIG. 1 is a block diagram that illustrates a conceptual view of a network system having a metro-based cloud exchange that provides multiple cloud exchange points and with network function virtualization infrastructure, in accordance with techniques described herein.

Each of cloud-based services exchange points 128A-128C (described hereinafter as "cloud exchange points" and collectively referred to as "cloud exchange points 128") of cloud-based services exchange 100 ("cloud exchange 100") may represent a different data center (or interconnection facility) geographically located within the same metropolitan area ("metro-based," e.g., in New York City, N.Y.; Silicon Valley, Calif.; Seattle-Tacoma, Wash.; Minneapolis-St. Paul, Minn.; London, UK; etc.) to provide resilient and independent cloud-based services exchange by which cloud-based services customers ("cloud customers") and cloud-based service providers ("cloud providers") connect to receive and provide, respectively, cloud services. In various examples, cloud exchange 100 may include more or fewer cloud exchange points 128. In some instances, a cloud exchange 100 includes just one cloud exchange point 128. As used herein, reference to a "cloud exchange" or "cloud-based services exchange" may refer to a cloud exchange point. A cloud exchange provider may deploy instances of cloud exchanges 100 in multiple different metropolitan areas, each instance of cloud exchange 100 having one or more cloud exchange points 128.

Any one or more of cloud exchange points 128 may be used to implement, at least in part, NFVI 102. Each of cloud exchange points 128 includes network infrastructure and an operating environment by which cloud customers 108A-108C (collectively, "cloud customers 108") receive cloud services from multiple cloud service providers 110A-110N (collectively, "cloud service providers 110"). The cloud service provider 110 may host one of more cloud services. As noted above, the cloud service providers 110 may be public or private cloud service providers.

Cloud exchange 100 provides customers of the exchange, e.g., enterprises, network carriers, network service providers, and SaaS customers, with secure, private, virtual connections to multiple cloud service providers (CSPs) globally. The multiple CSPs participate in the cloud exchange by virtue of their having at least one accessible port in the cloud exchange by which a customer may connect to the one or more cloud services offered by the CSPs, respectively. Cloud exchange 100 allows private networks of any customer to be directly cross-connected to any other customer at a common point, thereby allowing direct exchange of network traffic between the networks of the customers.

Further details regarding example cloud exchange 100 of FIG. 1 may be found in U.S. Provisional Patent Application Ser. No. 62/908,976 entitled "VIRTUALIZED NETWORK FUNCTIONS VERIFICATION USING DECENTRALIZED IDENTIFIERS," filed on Oct. 1, 2009, which is hereby incorporated by reference herein in its entirety. Further details regarding route advertisements may be found in U.S. patent application Ser. No. 16/228,540, filed Dec. 20, 2018, which is incorporated by reference in its entirety.

Further example details of a cloud-based services exchange can be found in U.S. patent application Ser. No. 15/099,407, filed Apr. 14, 2006 and entitled "CLOUD-BASED SERVICES EXCHANGE;" U.S. patent application Ser. No. 14/927,451, filed Oct. 29, 2005 and entitled "INTERCONNECTION PLATFORM FOR REAL-TIME CONFIGURATION AND MANAGEMENT OF A CLOUD-BASED SERVICES EXCHANGE;" and U.S. patent application Ser. No. 14/927,306, filed Oct. 29, 2005 and entitled "ORCHESTRATION ENGINE FOR REAL-TIME CONFIGURATION AND MANAGEMENT OF INTERCONNECTIONS WITHIN A CLOUD-BASED SERVICES EXCHANGE;" each of which are incorporated herein by reference in their respective entireties.

Cloud customers 108 may receive cloud-based services directly via a layer 3 (L3) peering and physical connection to one of cloud exchange points 128 or indirectly via one of network service providers 106A-106B (collectively, "NSPs 106," or alternatively, "carriers 106"). Cloud customers 108 may include customers associated with a VNF 306A as described above. For example, cloud customers 108 may include systems used by any or all of customer devices used by cloud client 118 to access cloud services via VNF executing in NFVI 102 of cloud exchange points 128. NSPs 106 provide "cloud transit" by maintaining a physical presence within one or more of cloud exchange points 128 and aggregating layer 3 access from one or customers 108. NSPs 106 may peer, at layer 3, directly with one or more cloud exchange points 128 and in so doing offer indirect layer 3 connectivity and peering to one or more customers 108 by which customers 108 may obtain cloud services from the cloud exchange 100. Each of cloud exchange points 128, in the example of FIG. 1, is assigned a different autonomous system number (ASN). For example, cloud exchange point 128A is assigned ASN 1, cloud exchange point 128B is assigned ASN 2, and so forth. Each cloud exchange point 128 is thus a next hop in a path vector routing protocol (e.g., BGP) path from cloud service providers 110 to customers 108. As a result, each cloud exchange point 128 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more cloud service providers 110 to customers. In other words, cloud exchange points 128 may internalize the eBGP peering relationships that cloud service providers 110 and customers 108 would maintain on a pair-wise basis. Instead, a customer 108 may configure a single eBGP peering relationship with a cloud exchange point 128 and receive, via the cloud exchange, multiple cloud services from one or more cloud service providers 110. While described herein primarily with respect to eBGP or other layer 3 routing protocol peering between cloud exchange points and customer, NSP, or cloud service provider networks, the cloud exchange points may learn routes from these networks in other way, such as by static configuration, or via Routing Information Protocol (RIP), Open Shortest Path First (OSPF), Intermediate System-to-Intermediate System (IS-IS), or other route distribution protocol.

As examples of the above, customer 108C is illustrated as having contracted with a cloud exchange provider for cloud exchange 100 to directly access layer 3 cloud services via cloud exchange points 128C. In this way, customer 108C receives redundant layer 3 connectivity to cloud service provider 110A, for instance. Customer 108C, in contrast, is illustrated as having contracted with the cloud exchange provider for cloud exchange 100 to directly access layer 3 cloud services via cloud exchange point 128C and also to have contracted with NSP 106B to access layer 3 cloud services via a transit network of the NSP 106B. Customer 108B is illustrated as having contracted with multiple NSPs 106A, 106B to have redundant cloud access to cloud exchange points 128A, 128B via respective transit networks of the NSPs 106A, 106B. The contracts described above are instantiated in network infrastructure of the cloud exchange points 128 by L3 peering configurations within switching devices of NSPs 106 and cloud exchange points 128 and L3 connections, e.g., layer 3 virtual circuits, established within cloud exchange points 128 to interconnect cloud service provider 110 networks to NSPs 106 networks and customer 108 networks, all having at least one port offering connectivity within one or more of the cloud exchange points 128.

In some examples, cloud exchange 100 may provide an operating environment that allows a corresponding one of customer customers 108A, 108B of any network service providers (NSPs) or "carriers" 106A-106B (collectively, "carriers 106") or other cloud customers including customers 108C to be directly connected, via a virtual layer 2 (L2) or layer 3 (L3) connection to any other customer network and/or to any of CSPs 110, thereby allowing direct exchange of network traffic among the customer networks and CSPs 110. The virtual L2 or L3 connection may be referred to as a "virtual circuit."

Carriers 106 may each represent a network service provider that is associated with a transit network by which network subscribers of the carrier 106 may access cloud services offered by CSPs 110 via the cloud exchange 100. In general, customers of CSPs 110 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 110 via the cloud exchange 100.

In this way, cloud exchange 100 streamlines and simplifies the process of partnering CSPs 110 (or any NSP including an ISP) and customers (via carriers 106 or directly) in a transparent and neutral manner. One example application of cloud exchange 100 is a co-location and interconnection data center in which CSPs 110 and carriers 106 and/or customers 108 may already have network presence, such as by having one or more accessible ports available for interconnection within the data center, which may represent any of cloud exchange points 128. This allows the participating carriers, customers, and CSPs to have a wide range of interconnectivity options within the same facility. A carrier/customer may in this way have options to create many-to-many interconnections with only a one-time hook up to one or more cloud exchange points 128. In other words, instead of having to establish separate connections across transit networks to access different cloud service providers or different cloud services of one or more cloud service providers, cloud exchange 100 allows customers to interconnect to multiple CSPs and cloud services.

In addition to allowing customers to interconnect to multiple CSPs and cloud services, cloud exchange 100 allows customers to specify which NSP, amongst carriers 106, to use for connecting to cloud exchange 100. Conventional implementations do not permit customers to control its own network connectivity. As described herein, other data centers mandate which ones amongst a plurality of NSPs that their customers can utilize for connecting their devices to each other and to the multiple CSPs for cloud services.

Cloud exchange 100 includes programmable network platform 120 for dynamically programming cloud exchange 100 to responsively and assuredly fulfill service requests that encapsulate business requirements for services provided by cloud exchange 100 and/or cloud service providers 110 coupled to the cloud exchange 100. Programmable network platform 120 may include network service orchestrator 112 that handles customer (e.g., cloud client) requests for deployment of VNFs. For example, network service orchestrator 112 may organize, direct and integrate underlying services through virtual machines (or containers), as well as other software and network sub-systems, for managing various services (e.g., deployment of VNFs). The programmable network platform 120 may, as a result, orchestrate a business-level service across heterogeneous cloud service providers 110 according to well-defined service policies, quality of service policies, service level agreements, and costs, and further according to a service topology for the business-level service.

Hardware and/or software components for NFVI 102 implement network management and resource orchestration systems of which at least one, in general, performs at least one technique described herein. In one example, the network management and resource orchestration systems form an architecture having at least three functional blocks of which one example functional block, an orchestration system, is responsible for onboarding of new network services (NS) and virtual network function (VNF) packages; NS lifecycle management; global and local resource management; and validation and authorization of network functions virtualization infrastructure (NFVI) resource requests. In some examples, network service orchestrator 112 in programmable network platform 120 is an example of the orchestration system while, in other examples, the orchestration system instructs (e.g., by way of function call) network service orchestrator 112 to dynamically allocate resources (e.g., compute) resources. Network service orchestrator 112 distributes physical resources, such as processing cores in one or more computing devices of NFVI 102, for executing VNFs. Other functional blocks (e.g., management blocks) oversee lifecycle management of VNF instances; fill the coordination and adaptation role for configuration and event reporting between NFV infrastructure (NFVI) and Element/Network Management Systems, and control and manage the NFVI compute, storage, and network resources. While shown separately as part of programmable network platform 120, these management blocks may reside in NFVI 102 and cooperate with the orchestration system when deploying VNFs.

NFVI 102 includes one or more servers ("servers") for executing/hosting virtual network functions (VNFs) that apply network services to packet flows. Network service orchestrator 112 handles deployment and organization of these network services, for example, by instantiating the VNFs on the servers to execute such network services.

The programmable network platform 120 enables the cloud service providers 110 that administer the cloud exchange 100 to dynamically configure and manage the cloud exchange 100 to, for instance, facilitate physical and virtual connections for cloud-based services delivery from multiple cloud service providers 110 to one or more cloud customers 108. The cloud exchange 100 may enable customers 108 to bypass the public Internet or an undesired NSP to directly connect to cloud services providers 110 so as to improve performance, reduce costs, increase the security and privacy of the connections, and leverage cloud computing for additional applications. In this way, enterprises, network carriers, and SaaS customers, for instance, can at least in some aspects integrate cloud services with their internal applications as if such services are part of or otherwise directly coupled to their own data center network.

In some examples, programmable network platform 120 enables cloud exchange 100 to configure customers 108 with layer 3 (L3) network connectivity as network services, associate each customer with at least one L3 instance, and provide CSPs 110 and carriers 106 with access to the L3 instances. As described herein, a customer may request additional network services corresponding to the L3 instance of a virtual network (e.g., L3VPN) to link multiple customer sub-networks (e.g., subnets), for example purposes of transferring the customer's data between the multiple sub-networks (e.g., between branch offices) and obtaining Cloud/Internet connectivity services from CSPs 110/carriers 106. As described herein, a virtual network device (e.g., a L3 router) in the customer's network may receive route advertisements directed to the L3 instance and apply some techniques described herein; in some examples, the route advertisements are received from peers within an NSP that was selected by the customer. As an alternative, programmable network platform 120 enables cloud exchange 100 to configure customers 108 with layer 2 (L2) network connectivity and a L2 instance (e.g., VPN or VPLS) of the customer's virtual network. A L2 switch in the customer network may assign VLANs (e.g., branch offices) to specific switch ports, which in turn may be in different L3 subnets, and therefore in different domains. A multi-VLAN environments allows different L3 networks to share a L2 instance and common L2 network infrastructure.

Programmable network platform 120 may represent an application executing within one or more data centers of the cloud exchange 100 or alternatively, off-site at a back office or branch of the cloud provider (for instance). Programmable network platform 120 may be distributed in whole or in part among the data centers, each data center associated with a different cloud exchange point 128 to make up the cloud exchange 100. Although shown as administering a single cloud exchange 100, programmable network platform 120 may control service provisioning for multiple different cloud exchanges. Alternatively or additionally, multiple separate instances of the programmable network platform 120 may control service provisioning for respective multiple different cloud exchanges.

In the illustrated example, programmable network platform 120 includes a service interface (or "service API") 114 that defines the methods, fields, and/or other software primitives by which applications 111, such as a customer portal, may invoke the programmable network platform 120. The service interface 114 may allow carriers 106, customers 108, and/or cloud service providers 110 programmable access to capabilities and assets of the cloud exchange 100 according to techniques described herein.

For example, the service interface 114 may facilitate machine-to-machine communication to enable dynamic provisioning of virtual circuits in the cloud exchange for interconnecting customer and/or cloud service provider networks. In this way, the programmable network platform 120 enables the automation of aspects of cloud services provisioning. For example, the service interface 114 may provide an automated and seamless way for customers to establish, de-install and manage interconnections among multiple, different cloud providers participating in the cloud exchange.

Customer 108B represents (or includes) a customer/tenant (external) network for cloud exchange 100. Customer 108B exchanges packetized data in packet flows with one or more other networks, e.g., via virtual circuits or other connection through cloud exchange point 128A. In some cases, NFVI 102 applies one or more network services to the packet flows on behalf of an entity associated with customer 108B.

NFVi 102 may be executed by one or more computing devices in a centralized or distributed manner. NFVi 102 operates a platform on which servers (e.g., physical or virtual servers) run virtualization software (e.g., hypervisors) in virtualization layers that enable virtual execution environments on which VNF images (including the network infrastructure software) are deployed. In operation with such VNFs, the virtualization layer may virtualize network infrastructure components (e.g., for data plane and/or control plane functionality) including networking protocols such as those using in routing/switching. An example server of NFVI 102 may provide, via the virtualization layer, one or more virtual machines (VMs) of which each VM emulates hardware for running software. In other words, an example VM (e.g., a LINUX kernel VM (KVM)) provides a virtualized operating system and application suite (e.g., to deploy VNFs) for customer access. Alternatively, or additionally, the example server may provide containers (e.g., such as those provided by the open source Docker Container application), or other virtual execution environments in which VNFs are implemented. In some examples, NFVi 102 further includes a virtualization layer over the hardware to offer virtual computing, virtual storage, and virtual network for executing VNFs.

In the illustrated example, customer 108B exchanges packets for packet flows with cloud service provider networks 110A-110N. A VNF executed by the example server in NFVI 102 applies a network function, in some cases as part of a network service, to packets for the packet flows.

This VNF may be referred to as a tenant VNF or customer VNF in that it is assigned to or otherwise associated with a tenant/customer of the NFVI 102 provider (here, also the cloud exchange 100 provider). In other words, the customer VNF processes packet flows associated with that customer. The customer VNF may be leased or sold to the tenant by NFVI 102 provider, or the tenant may deploy the customer VNF to the example server in NFVI 102 or virtual execution elements thereof. Virtual execution elements may include virtual machines or containers. The customer may invoke service interface 114 or otherwise request a service chain in NFVI 102 that includes the customer VNF for packet flows destined to and/or sourced by customer 108B. The server may execute multiple VNFs associated with multiple different customer, each VNF of the VNFs processing one or more packet flows associated with the customer for that VNF.

As described herein, NFVi 102 providers an operating environment for a routing engine providing route and packet flow evaluation for routes advertised and packet flows between any pair of CSP networks 110, NSPs 106, and customer networks 108. While primarily described as being implemented using VNFs, routing engines described herein may be implemented using dedicated appliances or using computing devices such as physical (e.g., real) or virtual servers.

In some examples, VNF(s) may be virtual routers that maintain various information (e.g., a map and routing information) of peer devices or simply "peers" (e.g., network devices such as routers having routing engines). VNF(s), in accordance with various networking protocols, establishes sessions with a peer and exchanges messages during that peering sessions. VNF(s), in accordance with a virtual router network service, may generate routes from exchanged message data and stores those routes in routing information (e.g., a routing table or Routing information Base (RIB)). Typically, the routing information will be used to route packets among different networks, which may include customer branch offices, remote data centers, cloud service provider networks, and others.

The present disclosure described various techniques that enable an entity to purchase a NSP connection (e.g., an Internet/Cloud connection) through a NSP of the entity's choice. While the following describes the entity as having a network of user devices in different physical locations/ virtual zones (e.g., branch offices), the entity may be any one of customers 108. Upon purchasing the above connection, the entity becomes a cloud exchange customer, such as customer 108A, and the entity's network of user devices may exchange data and/or application services with each other and/or with one or more CSPs 110. Cloud exchange 100 handles the entity's network traffic, including Internet traffic between the entity's user devices and Internet resources, through the entity's chosen NSP. In some examples, the entity and their chosen NSP may have an existing relationship (e.g., contractual relationship), and the entity leverage that relationship to build a network communication backbone to handle the entity's network traffic while availing cloud exchange 100.

According to one example technique, programmable network platform 120 configures a virtual network device in NFVI 102 to run a network service for a customer such as the above-mentioned entity who became customer 108A. It should be noted that the network service may be configured for any one of customers 108 desiring network connectivity with a provider of their choosing instead of arbitrary choice or one selected by the data center provider. Programmable network platform 120 may receive, from customer 108A, network information for a network service provider, such as carrier 106B, and a request corresponding to a network service provider connectivity service between carrier 106B and customer 108A. While conventional techniques would have selected for customer 108A a different network service provider, such as carrier 106A, programmable network platform 120 assigns, in response to receiving the request, a remote port to the virtual network device of the customer in cloud exchange 100. The network information, in general, identifies customer 108A's desired network service provider, carrier 106A, and includes, but is not limited to, a name and specific location in cloud exchange 100 of carrier 106B's physical presence, for example, carrier 106B's network devices (e.g., a patch panel identifier). In some examples, programmable network platform 120 uses the network information to identify peers for routing customer 108A's network traffic and for each peer, determines a network address and other network information. In accordance with the network information, programmable network platform 120 may configure the remote port with access to the network service provider, and then, configure, in performance of the network service provider connectivity service, cloud exchange 100 to connect, via the remote port, the virtual network device and the desired network service provider for customer 108A. After completing the connection, the virtual network device handles network traffic between customer and 108A carrier 106B.

The network information may be submitted, as order information, for purchasing the remote port and associated network service provider connectivity service. As an example, the network information may include a set of parameters defining an interconnection within the data center between the remote port and a patch panel for the network service provider. Based on validity of the network information or a response from the network service provider, programmable network platform 120 may output an indication of authorization for the interconnection.

As an example, customer 108A may represent several external sites (e.g., branch offices) in which a number of user devices operate. Via one or more virtual network devices (at least one of which functioning as a virtual switch or router), cloud exchange 100 routes, through carrier 106B, incoming and outgoing packets to and from those sites. Programmable network platform 120 may configure the virtual switch of customer 108A to direct the incoming and outgoing packets to the assigned remoted port and along a path through carrier 106B's network. Such a path may be a virtual path that includes a peer (e.g., an edge router) running in cloud exchange 100 for carrier 106B and ultimately, to a destination in one of customer 108A's sites (e.g., for internal traffic), one or more CSPs 110 (e.g., for cloud services), and/or to another network resource (e.g., an Internet resource where carrier 106A is an ISP). The path may include a Layer 3 (L3) connection through external network devices of carrier 106B, and routing customer 108A's incoming and outgoing packets through those devices may be in accordance with a number of network communication protocols.

Techniques as described herein enable additional network connectivity options for customers 108 by allowing each customer 108 to determine its own network connectivity configuration. Cloud exchange 100 provides an interface through which customer 108B, for example, submits data identifying a desired NSP and further provides functionality to effectuate that submission. Cloud exchange 100 may extend network connectivity control to interconnected peers (e.g., interconnected customers, interconnected providers, or interconnected provider and customer) such that any packet destined for an external network is carried by the desired NSP of the interconnected peers. When one peer (e.g., a network such as customer 108A) is connected via a network device and a remote port to another peer (e.g., another customer network, another part of a same customer network, or an NSP/CSP), the network device runs as a routing engine operative to establish sessions (e.g., peering sessions) between a first network (e.g., customer 108A) and a second network (e.g., customer 108B, NSP 104C, and/or CSP 110A) to exchange message data with destinations in the second network. The established sessions initiate route establishment where routes are exchanged between networks. Routing information generated from the message data being exchanged during these sessions may be configured to delineate routes for transmitting packetized data from sources in the first network to the destinations in the second network.

With respect to L3 peering, the routing engine may examine one or more hops in each route for cloud service provider networks (e.g., autonomous systems) or endpoints. In the example data center, the routing engine may reside near A-side (e.g., customer 108A) or Z-side (e.g., CSP 110A or NSP 106B) of an interconnection and continue operating as an intermediary for packet communications between A-side and Z-side. In other examples, the routing engine receives a packet from an internal (physically attached) device and if the intended destination for that packet is determined to be an external endpoint, the routing engine resolves a route to that endpoint through the NSP selected by the A-side customer.

Figure 2:
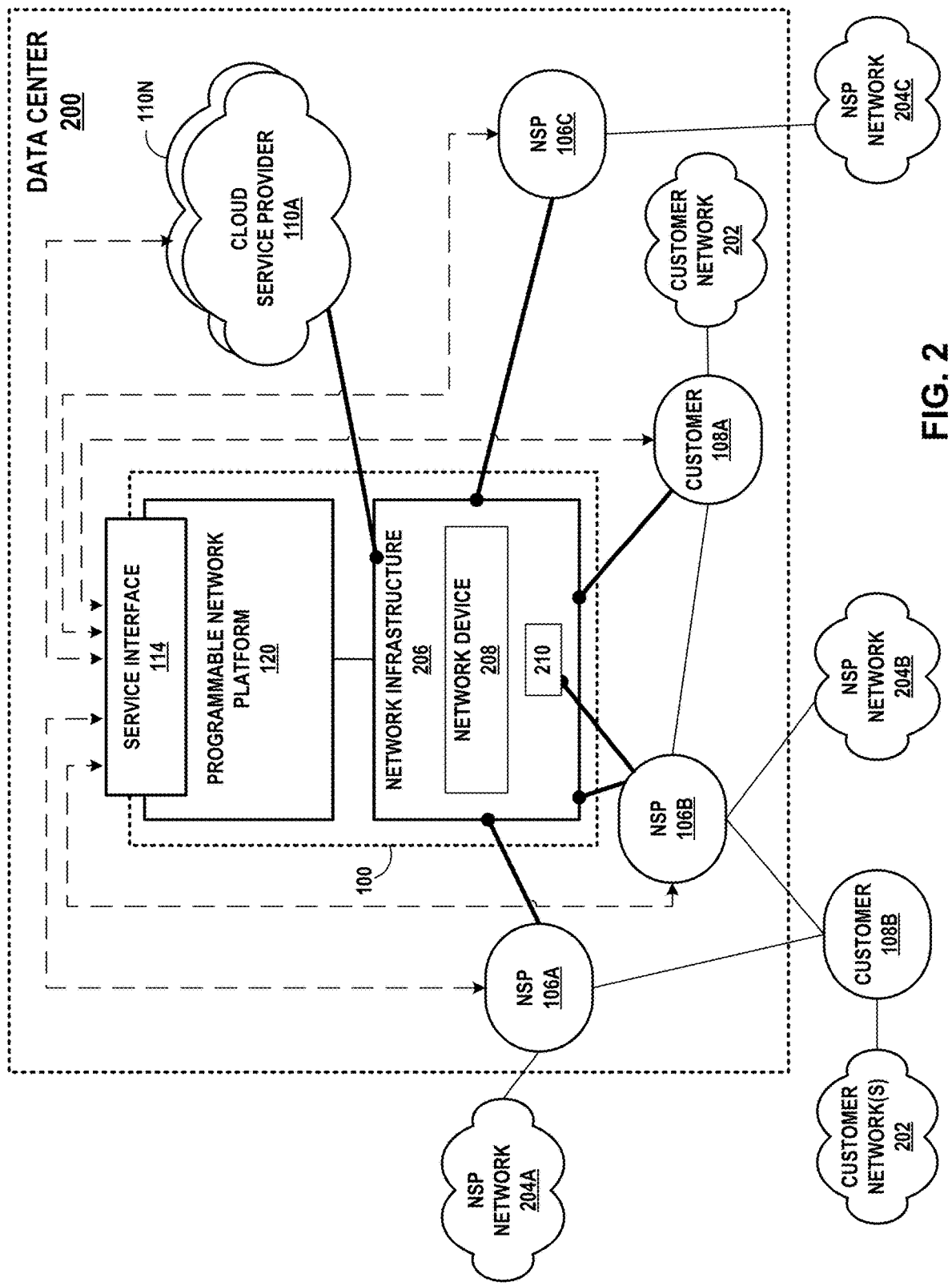
FIG. 2 is a block diagram illustrating a high-level view of a data center that provides an operating environment for a cloud-based services exchange, according to techniques described herein.

FIG. 2 is a block diagram illustrating an example data center that provides an operating environment for VNFs with tenant-driven resource allocation, in accordance with one or more aspects of the techniques described in this disclosure.

In this example data center 200, cloud exchange 100 allows a corresponding one of customer networks 202 and NSP networks 204A-204C (collectively, "'NSP or 'carrier' networks 204") of any NSPs 106A-106C or other customers to be directly cross-connected, via a layer 2 (L2) or layer 3 (L3) connection to any other customer network, thereby allowing exchange of service traffic among the customer networks and CSPs 110. Data center 200 may be entirely located within a centralized area, such as a warehouse or localized data center complex, and provide power, cabling, security, and other services to NSPs, customers, and cloud service providers that locate their respective networks within the data center 200 (e.g., for colocation) and/or connect to the data center 200 by one or more external links. For these NSPs, customers, and cloud service providers, external networks (or sub-networks) may be connected via the one or more external links to data center 200 and some of the external networks may further connected to public and/or private networks (e.g., non-tenant NSPs and CSPs).

Cloud exchange 100 includes network infrastructure 206 (e.g., for a virtual network) and an operating environment by which customer networks 202 may receive services from one or more CSPs 110 via interconnections. In the example of FIG. 2, network infrastructure 206 represents the switching fabric of an interconnection facility of cloud exchange 100 and includes multiple ports that may be dynamically interconnected with virtual circuits by, e.g., invoking service interface 114 of the programmable network platform 120. Each of the ports is associated with NSPs 106, customers 108, and CSPs 110. This enables an NSP customer to have options to create many-to-many interconnections with only a one-time hook up to the switching network and underlying network infrastructure 206 that presents an interconnection platform for cloud exchange 100. In other words, instead of having to establish separate connections across transit networks to access different CSPs 110, cloud exchange 100 allows a customer to interconnect to multiple CSPs 110 using network infrastructure 206 within data center 200.

Network device 208 may be part of the virtual network for customer 108B and configured for handling customer 108B's network traffic between customer network 202 and either another customer network or a cloud service provider of CSPs 110. As described herein, remote port 210 is an example of the above-mentioned ports and may be operative to connect network device 208 to NSP 106B. Remote port 210 enables an interconnection between NSP 106B and customer 108B even though customer 108B does not have a physical presence and only maintains a virtual presence in data center 200.

An interconnection as described herein may refer to, e.g., a physical cross-connect, an Ethernet connection such as a Layer 2 VPN or virtual private LAN (e.g., E-LINE, E-LAN, E-TREE, or E-Access), an Internet exchange-based interconnection in which respective network devices (e.g., routers and/or switches) of interconnected customers directly peer and exchange layer 3 routes for service traffic exchanged via network infrastructure 206, and a cloud exchange in which customer routers peer with network infrastructure 206 (or "provider") network devices rather than directly with other customers. Cloud exchange 100 may provide, to customers, interconnection services to network services provided by NSPs 106 or CSPs 110. That is, an interconnection service by cloud exchange 100 provides access to a network service (e.g., VNF) provided by NSPs 106 or CSPs 110.

For interconnections at layer 3 or above, customers 108 may receive services directly via a layer 3 peering and physical connection to one of colocation facility exchange points or indirectly via one of NSPs 106. NSPs 106 provide "transit" by maintaining a physical presence within data center 200 and aggregating layer 3 access from one or more customers 108. NSPs 106 may peer, at layer 3, directly with data center 200 and in so doing offer indirect layer 3 connectivity and peering to one or more customers 108 by which customers 108 may obtain services from the cloud exchange 100. In accordance with an example technique described herein, customers 108 may select one of NSPs 106 and, from that selected provider, receive services indirectly via a layer 3 peering and physical connection to remote port 210.

In instances in which cloud exchange 100 offers an internet exchange, network infrastructure 206 may be assigned a different autonomous system number (ASN). Network infrastructure 206 is thus a next hop in a path vector routing protocol (e.g., BGP) path from CSPs 110 to customers 108 and/or NSPs 106. As a result, cloud exchange 100 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more CSPs 110 to customers 108. In other words, cloud exchange 100 may internalize the eBGP peering relationships that CSPs 110 and customers 108 would maintain on a pair-wise basis. Instead, a customer 108 may configure a single eBGP peering relationship with cloud exchange 100 and receive, via the cloud exchange, multiple services from one or more CSPs 110. While described herein primarily with respect to eBGP or other layer 3 routing protocol peering between colocation facility points and customer, NSP, or service provider networks, the colocation facility points may learn routes from these networks in other way, such as by static configuration, or via Routing Information Protocol (RIP), Open Shortest Path First (OSPF), Intermediate System-to-Intermediate System (IS-IS), or other route distribution protocol.

Networking equipment (e.g., a gateway) may communicatively couple network infrastructure 206 (including network device 208) of data center 200 to a public network, a private network of customer devices, and/or a cloud network. A public network may be a network that is publicly available with few or no restrictions. For example, the public network may be a network that is part of the Internet. A private network may be a network that is part of an enterprise network and only accessible to authorized users. Customer devices are clients/tenants of data center 200 and, as an example, may be computing devices located in a branch office of the customer or otherwise associated with the customer. For example, a public gateway of NSP 206B may receive traffic having a destination address of a server hosting the network device 208 within the data center from the public network. Network device 208 may receive network traffic from the gateway.

In some examples, network infrastructure 206 includes one or more virtual machines or containers of NFVi that is used to deploy Virtualized Network Functions (VNFs). In these examples, a network service orchestrator may receive a request via a service interface (e.g., service interface 114 of FIG. 1) to deploy one or more virtualized network functions (e.g., virtual router, load balancer, and/or the like) that are implemented in the NFVi of network infrastructure 206. Network service orchestrator 112 may request a VNF distribution including one or more VNF images from a VNF provider. One or more VNF images may define a routing engine for a virtual routes.

When needed, Network Functions Virtualization (NFV) management distributes physical and/or virtual resources to VNFs running in servers of network infrastructure 206. Examples of the various physical resources include processing resources (e.g., processor cores), networking resources (e.g., physical network interface cards (NICs)), and storage resources (e.g., physical capacities of volatile and non-volatile memory). In one example, using a virtualization layer to generate an abstraction of various physical resources, NFV management configures that abstraction into countable virtual resources for use by VNFs running in servers of the NFVI. Examples of such virtual resources includes compute nodes (e.g., a virtual machine), virtual storage resources, and virtual network resources.

An orchestration system (e.g., network service orchestrator 112) in control of network infrastructure 206 may use NFV management to allocate physical resources, instantiate virtual machines or containers to operate as servers and then, instruct those servers to run one or more VNFs (e.g., forming a network service). There are a number of ways for a server to implement NFV management instructions, for example, by executing various software programs on computing hardware (e.g., processing circuitry), invoking appropriate operating system programs, and/or calling various functions through an API. NFV management may virtualize network interface cards (NICs) of a server into virtual network resources such as virtual network interface cards (VNICS) or virtual network interfaces (VNIs) and allocate these virtual resources to a virtual switch/virtual router such that each VNIC/VNI is identifiable in VNIC/VNI space and configured to direct communications to a device in a specific cloud network, to only a device in a specific customer network, or between these devices (i.e., as an intermediary). The VNIC/VNI space may refer to a range of virtual network identifiers for corresponding virtual network resources.

One or more servers may form at least part of a computer cluster or pod whose physical resources are virtualized into virtual network devices such as network device 208. Network device 208 may be labeled a network edge for cloud service providers 110 and network service providers 106. For each cloud service provider 110, the network edge provides customer network 202 access to cloud services provided by devices in a cloud network. For NSP 106B, the network edge provides customer network 202 with access to network services provided by devices in NSP 106B's network. Example network services include Internet access, customer network access, or cloud service access. In some examples, NSP 106B provides the network edge access to cloud services provided by devices in a cloud network.

An example server of network infrastructure 206 executes a VNF to perform various services such as routing and forwarding operations for packets directed to that VNF and intended for cloud service providers on the cloud network or received from cloud service providers on the cloud network. As described herein, the network edge of customer 108B may run a VNF for performing routing and forwarding operations for incoming/outgoing packets of customer network 202. Via remote port 210, the network edge that enables customer 108B to leverage NSP 106B for various benefits, including the use of NSP 106B as a network backbone for customer network 202.

As examples of the above for a cloud exchange deployment, customer network 202 in FIG. 2 is illustrated as having contracted with the cloud exchange provider for cloud exchange 100 to directly access layer 3 services via cloud exchange 100 and also to have contracted with NSP 106B to access layer 3 services via a transit network of NSP 106B. One or all of the contracts described above may be instantiated in network infrastructure 206 of the cloud exchange 100 by L3 peering configurations within switching devices of NSPs 106 and cloud exchange 100 and L3 connections, e.g., layer 3 virtual circuits, established within cloud exchange 100 to interconnect CSPs 110 to NSPs 106 and/or customer networks 202, all having at least one remote port 210 offering connectivity (e.g., network service provider connectivity) within cloud exchange 100. Customer network 202 is described as having a pre-existing relationship with NSP 106B to access layer 3 services via a transit network of NSP 106B.

To illustrate by way of example, if customer 108B contracts for interconnection services for an Internet connection with NSP 106B, customer 108B may receive the requested Internet connection (e.g., an ISP). In addition, if customer 108B contracts for interconnection services for a cloud service (e.g., AWS), customer 108B may receive the requested cloud service with one or more CSPs 110. As an alternative, if customer 108B contract for the requested cloud service with one or more CSPs 110 without the interconnection service, customer 108B may receive the requested cloud service via NSP 106B and/or remote port 210. Network device 208, via remote port 210, may exchange routing and forwarding information (e.g., advertised routes to destination ports) with neighbors (e.g., peers) of a network resource purporting to an endpoint in NSP 106B (as the ISP) or the CSP 110. When a route to the destination is exchanged via a BGP peering session with network device 208, network device 208 may instantiate a VNF to resolve and/or distribute advertised routes. In some examples, network device 208 installs and distributes an advertised BGP route/AS path to a destination in the Internet or a cloud network.

A BGP peer may be a device in a network for NSP 106B or a cloud network and may be configured to communicatively couple network device 208, via remote port 210, to the Internet, customer networks 202, and/or one or more cloud services provided by CSPs 110. The cloud network may be generally hidden from or otherwise unavailable to devices on a public network. For example, cloud network may receive, via NSP 106B and network device 208, packet flows from customer networks 202 that are communicated to a cloud service from a customer device or another cloud service. Examples of cloud services include Google Cloud, Azure, Oracle Cloud, Amazon Web Services (AWS), IBM Cloud, Alibaba Cloud, and Salesforce. In some aspects, cloud network can be an Equinix Cloud Exchange Fabric provided by Equinix Inc. of Redwood, Calif. Network infrastructure 206 may include a vendor-neutral VNF that combines two or more cloud services into a hybrid cloud service.

Figure 3A:
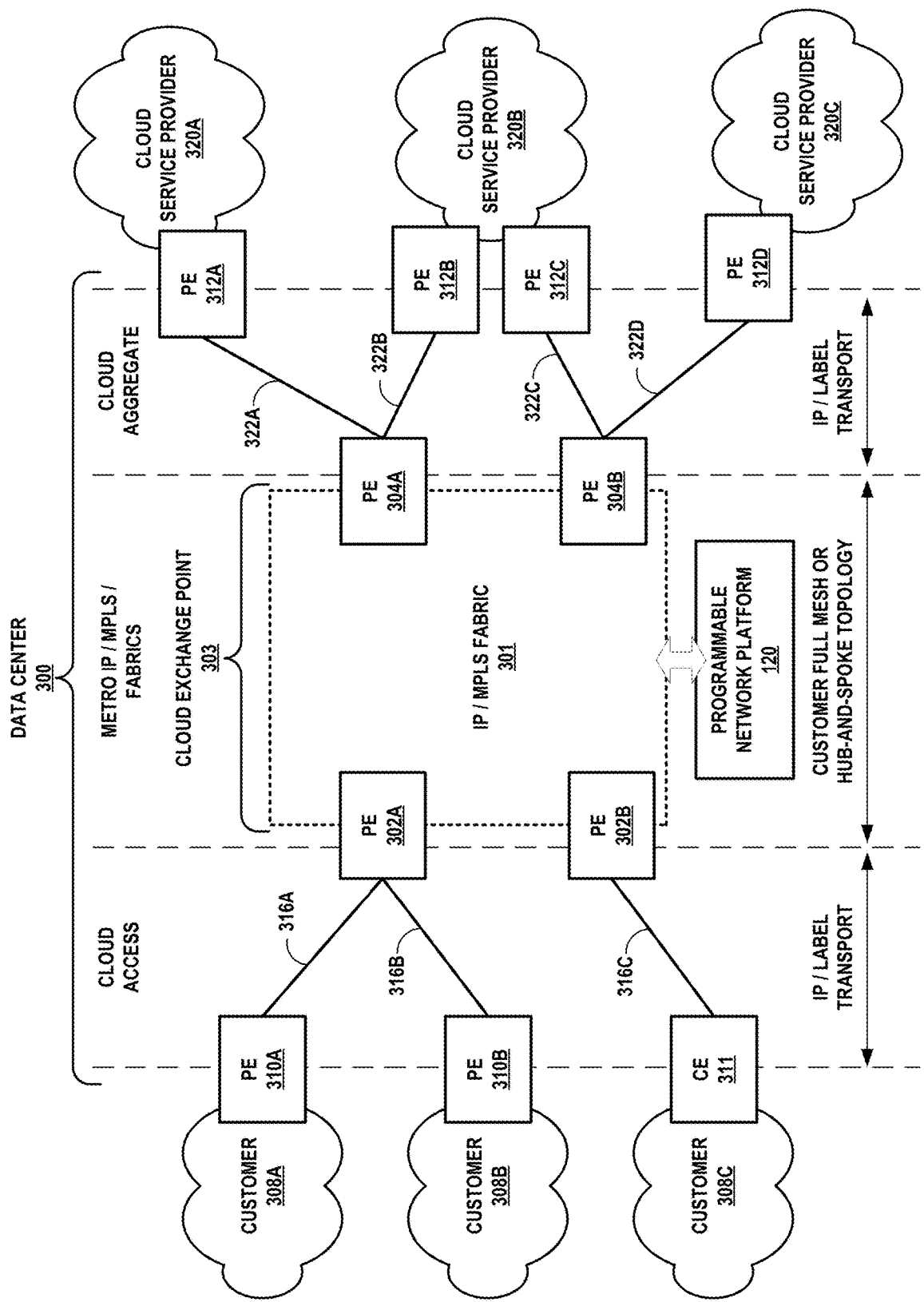
FIGS. 3A-3B are block diagrams illustrating example network infrastructure and service provisioning by a programmable network platform for a cloud exchange that facilitates network service provider connectivity services to customers of the cloud exchange provider, in accordance with techniques described in this disclosure.
Figure 3B:
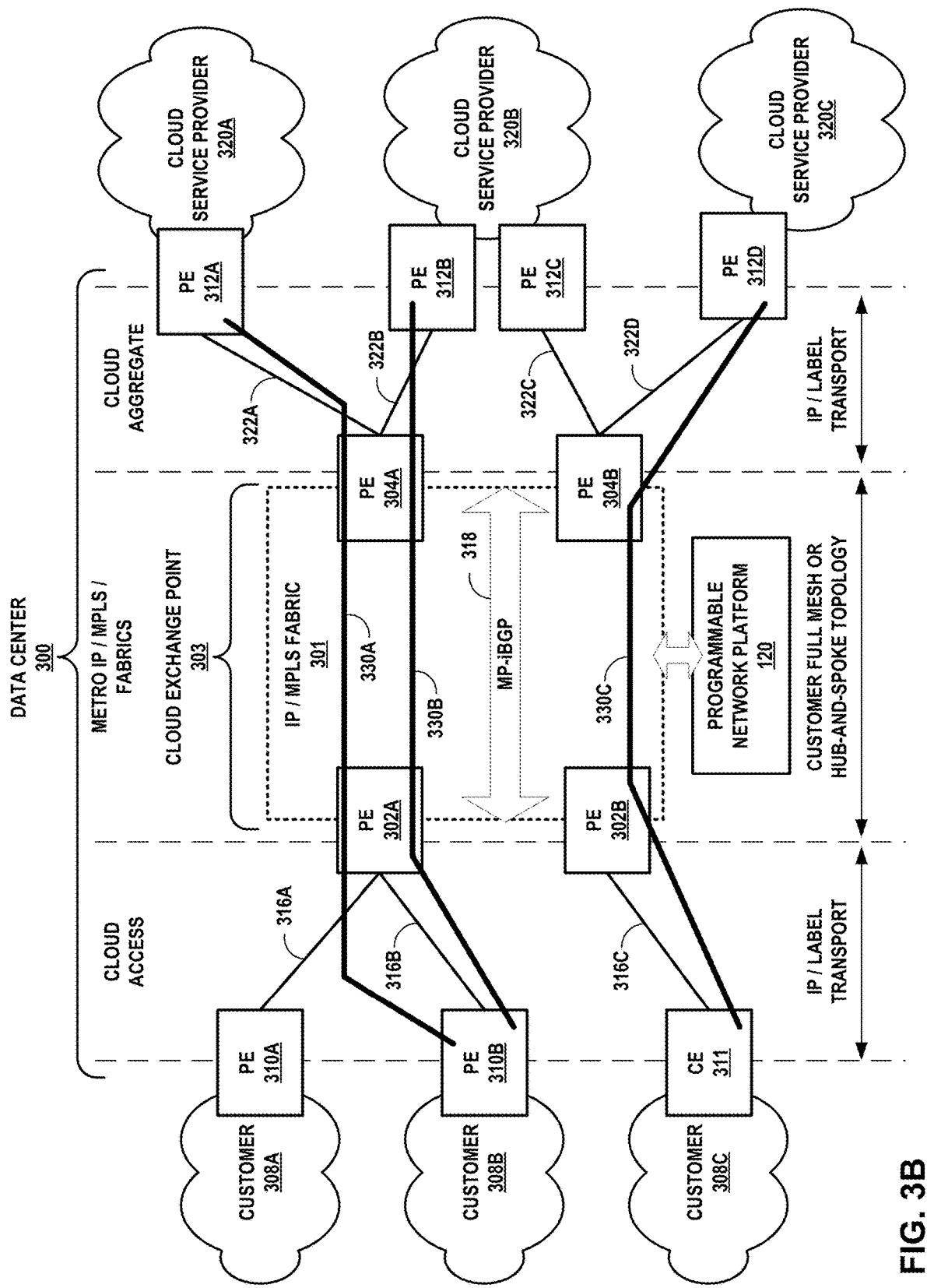

FIGS. 3A-3B are block diagrams illustrating example network infrastructure and service provisioning by a programmable network platform for a cloud exchange that aggregates the cloud services of multiple cloud service providers for provisioning to customers of the cloud exchange provider and aggregates access for multiple customers to one or more cloud service providers, in accordance with techniques described in this disclosure. In this example, customer networks 308A-308C (collectively, "customer networks 308"), each associated with a different customer, access a cloud exchange point within a data center 300 in order receive aggregated cloud services from one or more cloud service provider networks 320, each associated with a different cloud service provider 110. In some examples, customer networks 308 each include endpoint devices that consume cloud services provided by cloud service provider network 320. Example endpoint devices include servers, smart phones, television set-top boxes, workstations, laptop/tablet computers, video gaming systems, teleconferencing systems, media players, and so forth.

Customer networks 308A-308B include respective provider edge/autonomous system border routers (PE/ASBRs) 310A-310B. Each of PE/ASBRs 310A, 310B may execute exterior gateway routing protocols to peer with one of PE routers 302A-302B ("PE routers 302" or more simply "PEs 302") over one of access links 316A-316B (collectively, "access links 316"). In the illustrated examples, each of access links 316 represents a transit link between an edge router of a customer network 308 and an edge router (or autonomous system border router) of cloud exchange point 303. For example, PE 310A and PE 302A may directly peer via an exterior gateway protocol, e.g., exterior BGP, to exchange L3 routes over access link 316A and to exchange L3 data traffic between customer network 308A and cloud service provider networks 320. Access links 316 may in some cases represent and alternatively be referred to as attachment circuits for IP-VPNs configured in IP/MPLS fabric 301, as described in further detail below. Access links 316 may in some cases each include a direct physical connection between at least one port of a customer network 308 and at least one port of cloud exchange point 303, with no intervening transit network. Access links 316 may operate over a VLAN or a stacked VLAN (e.g, QinQ), a VxLAN, an LSP, a GRE tunnel, or other type of tunnel.

While illustrated and primarily described with respect to L3 connectivity, PE routers 302 may additionally offer, via access links 316, L2 connectivity between customer networks 308 and cloud service provider networks 320. For example, a port of PE router 302A may be configured with an L2 interface that provides, to customer network 308A, L2 connectivity to cloud service provider 320A via access link 316A, with the cloud service provider 320A router 312A coupled to a port of PE router 304A that is also configured with an L2 interface. The port of PE router 302A may be additionally configured with an L3 interface that provides, to customer network 308A, L3 connectivity to cloud service provider 320B via access links 316A. PE 302A may be configured with multiple L2 and/or L3 sub-interfaces such that customer 308A may be provided, by the cloud exchange provider, with a one-to-many connection to multiple cloud service providers 320.

To create an L2 interconnection between a customer network 308 and a cloud service provider network 320, in some examples, IP/MPLS fabric 301 is configured with an L2 bridge domain (e.g., an L2 virtual private network (L2VPN) such as a virtual private LAN service (VPLS), E-LINE, or E-LAN) to bridge L2 traffic between a customer-facing port of PEs 302 and a CSP-facing port of cloud service providers 320. In some cases, a cloud service provider 320 and customer 308 may have access links to the same PE router 302, 304, which bridges the L2 traffic using the bridge domain.

To create an L3 interconnection between a customer network 308 and a cloud service provider network 320, in some examples, IP/MPLS fabric 301 is configured with L3 virtual routing and forwarding instances (VRFs), as described in further detail below with respect to FIG. 4. In some cases, IP/MPLS fabric 301 may be configured with an L3 instance that includes one or more VRFs, and the L3 instance may link multiple cloud service provider networks 320. In this case, a customer network 308 may not need to be interconnected or have any physical presence in the cloud exchange or data center.

Each of access links 316 and aggregation links 322 may include a network interface device (NID) that connects customer network 308 or cloud service provider 328 to a network link between the NID and one of PE routers 302, 304. Each of access links 316 and aggregation links 322 may represent or include any of a number of different types of links that provide L2 and/or L3 connectivity.

In this example, customer network 308C is not an autonomous system having an autonomous system number. Customer network 308C may represent an enterprise, network service provider, or other customer network that is within the routing footprint of the cloud exchange point. Customer network includes a customer edge (CE) device 311 that may execute exterior gateway routing protocols to peer with PE router 302B over access link 316C. In various examples, any of PEs 310A-310B may alternatively be or otherwise represent CE devices.

Access links 316 include physical links. PE/ASBRs 310A-310B, CE device 311, and PE routers 302A-302B exchange L2/L3 packets via access links 316. In this respect, access links 316 constitute transport links for cloud access via cloud exchange point 303. Cloud exchange point 303 may represent an example of any of cloud exchange points 128. Data center 300 may represent an example of data center 201.

Cloud exchange point 303, in some examples, aggregates customers 308 access to the cloud exchange point 303 and thence to any one or more cloud service providers 320. FIGS. 3A-3B, e.g., illustrate access links 316A-316B connecting respective customer networks 308A-308B to PE router 302A of cloud exchange point 303 and access link 316C connecting customer network 308C to PE router 302B. Any one or more of PE routers 302, 304 may comprise ASBRs. PE routers 302, 304 and IP/MPLS fabric 301 may be configured according to techniques described herein to interconnect any of access links 316 to any of cloud aggregation links 322. As a result, cloud service provider network 320A, e.g., needs only to have configured a single cloud aggregate link (here, access link 322A) in order to provide services to multiple customer networks 308. That is, the cloud service provider operating cloud service provider network 302A does not need to provision and configure separate service links from cloud service provider network 302A to each of PE routers 310, 311, for instance, in order to provide services to each of customer network 308. Cloud exchange point 303 may instead connect cloud aggregation link 322A and PE 312A of cloud service provider network 320A to multiple cloud access links 316 to provide layer 3 peering and network reachability for the cloud services delivery.

In addition, a single customer network, e.g., customer network 308A, need only to have configured a single cloud access link (here, access link 316A) to the cloud exchange point 303 within data center 300 in order to obtain services from multiple cloud service provider networks 320 offering cloud services via the cloud exchange point 303. That is, the customer or network service provider operating customer network 308A does not need to provision and configure separate service links connecting customer network 308A to different PE routers 312, for instance, in order to obtain services from multiple cloud service provider networks 320. Cloud exchange point 303 may instead connect cloud access link 316A (again, as one example) to multiple cloud aggregate links 322 to provide layer 3 peering and network reachability for the cloud services delivery to customer network 308A.

Cloud service provider networks 320 each includes servers configured to provide one or more cloud services to users. These services may be categorized according to service types, which may include for examples, applications/ software, platforms, infrastructure, virtualization, and servers and data storage. Example cloud services may include content/media delivery, cloud-based storage, cloud computing, online gaming, IT services, etc.

Cloud service provider networks 320 include PE routers 312A-312D that each executes an exterior gateway routing protocol, e.g., eBGP, to exchange routes with PE routers 304A-304B (collectively, "PE routers 304") of cloud exchange point 303. Each of cloud service provider networks 320 may represent a public, private, or hybrid cloud. Each of cloud service provider networks 320 may have an assigned autonomous system number or be part of the autonomous system footprint of cloud exchange point 303.

In the illustrated example, an Internet Protocol/Multiprotocol label switching (IP/MPLS) fabric 301 interconnects PEs 302 and PEs 304. IP/MPLS fabric 301 include one or more switching and routing devices, including PEs 302, 304, that provide IP/MPLS switching and routing of IP packets to form an IP backbone. In some example, IP/MPLS fabric 301 may implement one or more different tunneling protocols (i.e., other than MPLS) to route traffic among PE routers and/or associate the traffic with different IP-VPNs. In accordance with techniques described herein, IP/MPLS fabric 301 implement IP virtual private networks (IP-VPNs) to connect any of customers 308 with multiple cloud service provider networks 320 to provide a data center-based 'transport' and layer 3 connection.

Whereas service provider-based IP backbone networks require wide-area network (WAN) connections with limited bandwidth to transport service traffic from layer 3 services providers to customers, the cloud exchange point 303 as described herein 'transports' service traffic and connects cloud service providers 320 to customers 308 within the high-bandwidth local environment of data center 300 provided by a data center-based IP/MPLS fabric 301. In some examples, IP/MPLS fabric 301 implements IP-VPNs using techniques described in Rosen & Rekhter, "BGP/MPLS IP Virtual Private Networks (VPNs)," Request for Comments 4364, February 2006, Internet Engineering Task Force (IETF) Network Working Group, the entire contents of which is incorporated by reference herein. In some example configurations, a customer network 308 and cloud service provider network 320 may connect via respective links to the same PE router of IP/MPLS fabric 301.

Access links 316 and aggregation links 322 may include attachment circuits that associate traffic, exchanged with the connected customer network 308 or cloud service provider network 320, with virtual routing and forwarding instances (VRFs) configured in PEs 302, 304 and corresponding to IP-VPNs operating over IP/MPLS fabric 301. For example, PE 302A may exchange IP packets with PE 310A on a bidirectional label-switched path (LSP) operating over access link 316A, the LSP being an attachment circuit for a VRF configured in PE 302A. As another example, PE 304A may exchange IP packets with PE 312A on a bidirectional label-switched path (LSP) operating over access link 322A, the LSP being an attachment circuit for a VRF configured in PE 304A. Each VRF may include or represent a different routing and forwarding table with distinct routes.

PE routers 302, 304 of IP/MPLS fabric 301 may be configured in respective hub-and-spoke arrangements for cloud services, with PEs 304 implementing cloud service hubs and PEs 302 being configured as spokes of the hubs (for various hub-and-spoke instances/arrangements). A hub-and-spoke arrangement ensures that service traffic is enabled to flow between a hub PE and any of the spoke PEs, but not directly between different spoke PEs. As described further below, in a hub-and-spoke arrangement for data center-based IP/MPLS fabric 301 and for southbound service traffic (i.e., from a CSP to a customer) PEs 302 advertise routes, received from PEs 310, to PEs 304, which advertise the routes to PEs 312. For northbound service traffic (i.e., from a customer to a CSP), PEs 304 advertise routes, received from PEs 312, to PEs 302, which advertise the routes to PEs 310.

For some customers of cloud exchange point 303, the cloud exchange point 303 provider may configure a full mesh arrangement whereby a set of PEs 302, 304 each couple to a different customer site network for the customer. In such cases, the IP/MPLS fabric 301 implements a layer 3 VPN (L3VPN) for cage-to-cage or redundancy traffic (also known as east-west or horizontal traffic). The L3VPN may effectuate a closed user group whereby each customer site network can send traffic to one another but cannot send or receive traffic outside of the L3VPN.

PE routers may couple to one another according to a peer model without use of overlay networks. That is, PEs 310 and PEs 312 may not peer directly with one another to exchange routes, but rather indirectly exchange routes via IP/MPLS fabric 301. In the example of FIG. 3B, cloud exchange point 303 is configured to implement multiple layer 3 virtual circuits 330A-330C (collectively, "virtual circuits 330") to interconnect customer network 308 and cloud service provider networks 322 with end-to-end IP paths. Each of cloud service providers 320 and customers 308 may be an endpoint for multiple virtual circuits 330, with multiple virtual circuits 330 traversing one or more attachment circuits between a PE/PE or PE/CE pair for the IP/MPLS fabric 301 and the CSP/customer. A virtual circuit 330 represents a layer 3 path through IP/MPLS fabric 301 between an attachment circuit connecting a customer network to the fabric 301 and an attachment circuit connecting a cloud service provider network to the fabric 301. Each virtual circuit 330 may include at least one tunnel (e.g., an LSP and/or Generic Route Encapsulation (GRE) tunnel) having endpoints at PEs 302, 304. PEs 302, 304 may establish a full mesh of tunnels interconnecting one another.

Each virtual circuit 330 may include a different hub-and-spoke network configured in IP/MPLS network 301 having PE routers 302, 304 exchanging routes using a full or partial mesh of border gateway protocol peering sessions, in this example a full mesh of Multiprotocol Interior Border Gateway Protocol (MP-iBGP) peering sessions. MP-iBGP or simply MP-BGP is an example of a protocol by which routers exchange labeled routes to implement MPLS-based VPNs. However, PEs 302, 304 may exchange routes to implement IP-VPNs using other techniques and/or protocols.

In the example of virtual circuit 330A, PE router 312A of cloud service provider network 320A may send a route for cloud service provider network 320A to PE 304A via a routing protocol (e.g., eBGP) peering connection with PE 304A. PE 304A associates the route with a hub-and-spoke network, which may have an associated VRF, that includes spoke PE router 302A. PE 304A then exports the route to PE router 302A; PE router 304A may export the route specifying PE router 304A as the next hop router, along with a label identifying the hub-and-spoke network. PE router 302A sends the route to PE router 310B via a routing protocol connection with PE 310B. PE router 302A may send the route after adding an autonomous system number of the cloud exchange point 303 (e.g., to a BGP autonomous system path (AS_PATH) attribute) and specifying PE router 302A as the next hop router. Cloud exchange point 303 is thus an autonomous system "hop" in the path of the autonomous systems from customers 308 to cloud service providers 320 (and vice-versa), even though the cloud exchange point 303 may be based within a data center. PE router 310B installs the route to a routing database, such as a BGP routing information base (RIB) to provide layer 3 reachability to cloud service provider network 320A. In this way, cloud exchange point 303 "leaks" routes from cloud service provider networks 320 to customer networks 308, without cloud service provider networks 320 to customer networks 308 requiring a direct layer peering connection.

PE routers 310B, 302A, 304A, and 312A may perform a similar operation in the reverse direction to forward routes originated by customer network 308B to PE 312A and thus provide connectivity from cloud service provider network 320A to customer network 308B. In the example of virtual circuit 330B, PE routers 312B, 304A, 302A, and 310B exchange routes for customer network 308B and cloud service provider 320B in a manner similar to that described above for establishing virtual circuit 330B. As a result, cloud exchange point 303 within data center 300 internalizes the peering connections that would otherwise be established between PE 310B and each of PEs 312A, 312B so as to perform cloud aggregation for multiple layer 3 cloud services provided by different cloud service provider networks 320A, 320B and deliver the multiple, aggregated layer 3 cloud services to a customer network 308B having a single access link 316B to the cloud exchange point 303.

Absent the techniques described herein, fully interconnecting customer networks 308 and cloud service provider networks 320 would require 3×3 peering connections between each of PEs 310 and at least one of PEs 312 for each of cloud service provider networks 320. For instance, PE 310A would require a layer 3 peering connection with each of PEs 312. With the techniques described herein, cloud exchange point 303 may fully interconnect customer networks 308 and cloud service provider networks 320 with one peering connection per site PE (i.e., for each of PEs 310 and PEs 312) by internalizing the layer 3 peering and providing data center-based 'transport' between cloud access and cloud aggregate interfaces.

In examples in which IP/MPLS fabric 301 implements BGP/MPLS IP VPNs or other IP-VPNs that use route targets to control route distribution within the IP backbone, PEs 304 may be configured to import routes from PEs 302 and to export routes received from PEs 312, using different asymmetric route targets. Likewise, PEs 302 may be configured to import routes from PEs 304 and to export routes received from PEs 310 using the asymmetric route targets. Thus, PEs 302, 304 may configured to implement advanced L3VPNs that each includes a basic backbone L3VPN of IP/MPLS fabric 301 together with extranets of any of customer networks 308 and any of cloud service provider networks 320 attached to the basic backbone L3VPN.

Each advanced L3VPN constitutes a cloud service delivery network from a cloud service provider network 320 to one or more customer networks 308, and vice-versa. In this way, cloud exchange point 303 enables any cloud service provider network 320 to exchange cloud service traffic with any customer network 308 while internalizing the layer 3 routing protocol peering connections that would otherwise be established between pairs of customer networks 308 and cloud service provider networks 320 for any cloud service connection between a given pair. In other words, the cloud exchange point 303 allows each of customer networks 308 and cloud service provider networks 320 to establish a single (or more for redundancy or other reasons) layer 3 routing protocol peering connection to the data center-based layer 3 connect. By filtering routes from cloud service provider networks 320 to customer networks 308, and vice-versa, PEs 302, 304 thereby control the establishment of virtual circuits 330 and the flow of associated cloud service traffic between customer networks 308 and cloud service provider networks 320 within a data center 300. Routes distributed into MP-iBGP mesh 318 may be VPN-IPv4 routes and be associated with route distinguishers to distinguish routes from different sites having overlapping address spaces.

Programmable network platform 120 may receive service requests for creating, reading, updating, and/or deleting end-to-end services of the cloud exchange point 303. In response, programmable network platform 120 may configure PEs 302, 304 and/or other network infrastructure of IP/MPLS fabric 301 to provision or obtain performance or other operations information regarding the service. Operations for provisioning a service and performed by programmable network platform 120 may include configuring or updating VRFs, installing SDN forwarding information, configuring LSPs or other tunnels, configuring BGP, configuring access links 316 and aggregation links 322, or otherwise modifying the configuration of the IP/MPLS fabric 301. Other operations may include making service requests to an orchestration system for cloud service provider networks 320, as described in further detail below.

Figure 4:
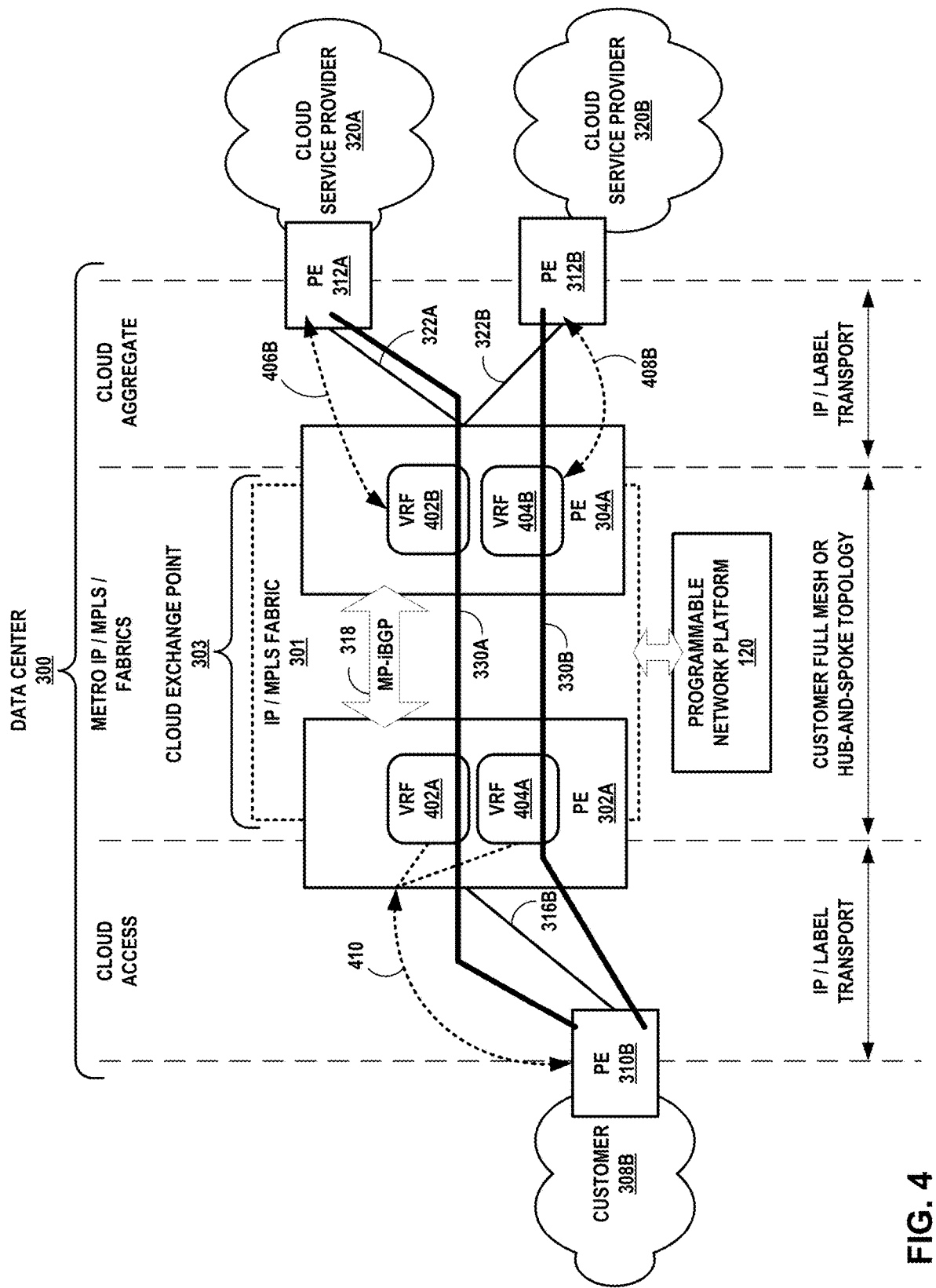
FIG. 4 is a block diagram illustrating an example of a data center-based cloud exchange point in which routers of the cloud exchange point are configured by programmable network platform with VPN routing and forwarding instances for routing and forwarding network traffic from a network service provider to a customer network, according to techniques described herein.

FIG. 4 is a block diagram illustrating an example of a data center-based cloud exchange point in which routers of the cloud exchange point are configured by programmable network platform 120 with VPN routing and forwarding instances for routing and forwarding aggregated service traffic from multiple cloud service provider networks to a customer network, according to techniques described herein. In this example, to establish virtual circuits 330A-330B, PE routers 302A and 304A of IP/MPLS fabric 301 are configured with VRFs. PE 302A is configured with VRFs 402A and 404A, while PE 304A is configured with VRFs 402B and 404B. VRF 402A is configured to import routes exported by VRF 402B, and VRF 402B is configured to import routes exported by VRF 402A. The configuration may include asymmetric route targets for import/export between VRFs 402A, 402B. VRF 404A is configured to import routes exported by VRF 402B, and VRF 402B is configured to import routes exported by VRF 402A. The configuration may include asymmetric route targets for import/export between VRFs 402A, 402B. This configuration whereby a customer can access multiple layer 3 services from different CSPs each associated with separate VRFs to access the layer 3 services provides isolation of respective traffic exchanged with the CSPs. In some examples, PE 302A may be configured with a single VRF to import routes exported by both VRF 402B and VRF 404B. As noted above with respect to FIGS. 3A-3B, PEs 302, 304 may be further configured to bridge layer 2 traffic between customer 308B and cloud service providers 320.

In this example, PE 304A operates BGP or other route distribution protocol peering connections 406B, 408B with respective PEs 312A, 312B to exchange routes with respective cloud service provider networks 320A, 320B. PE 302A operates a BGP or other route distribution protocol peering connection 410 with PE 310B to exchange routes with customer network 308B. In some examples, PEs 302A, 304A may be statically configured with routes for the site networks.

An administrator or a programmable network platform described herein for cloud exchange point 303 may configure PEs 302A, 304A with the VRF 402A-402B, 404A-404B in order to leak routes between PEs 312 and PE 310B and facilitate layer 3 connectivity for end-to-end IP paths illustrated here by virtual circuits 330, while potentially optimizing the end-to-end IP paths by fostering data center-based or at least metro-based connectivity. Cloud exchange point 303 may thus provide dedicated cloud service provider access to customer network 308B by way of private and/or public routes for the cloud service provider networks 320. In the northbound direction, cloud exchange point 303 may provide dedicated cloud service provider distribution to multiple customer networks 308 by way of private and/or public routes for the customer networks 308. Neither PE 310B nor any of PEs 302A, 304A need access to the full Internet BGP routing table to reach cloud service provider networks 320 or customer networks 308. Moreover, PEs 302A, 304A may be configured to aggregate customer/CSP routes and/or service traffic based on any one or more of physical, IP, service, and VRFs.

Figure 5:
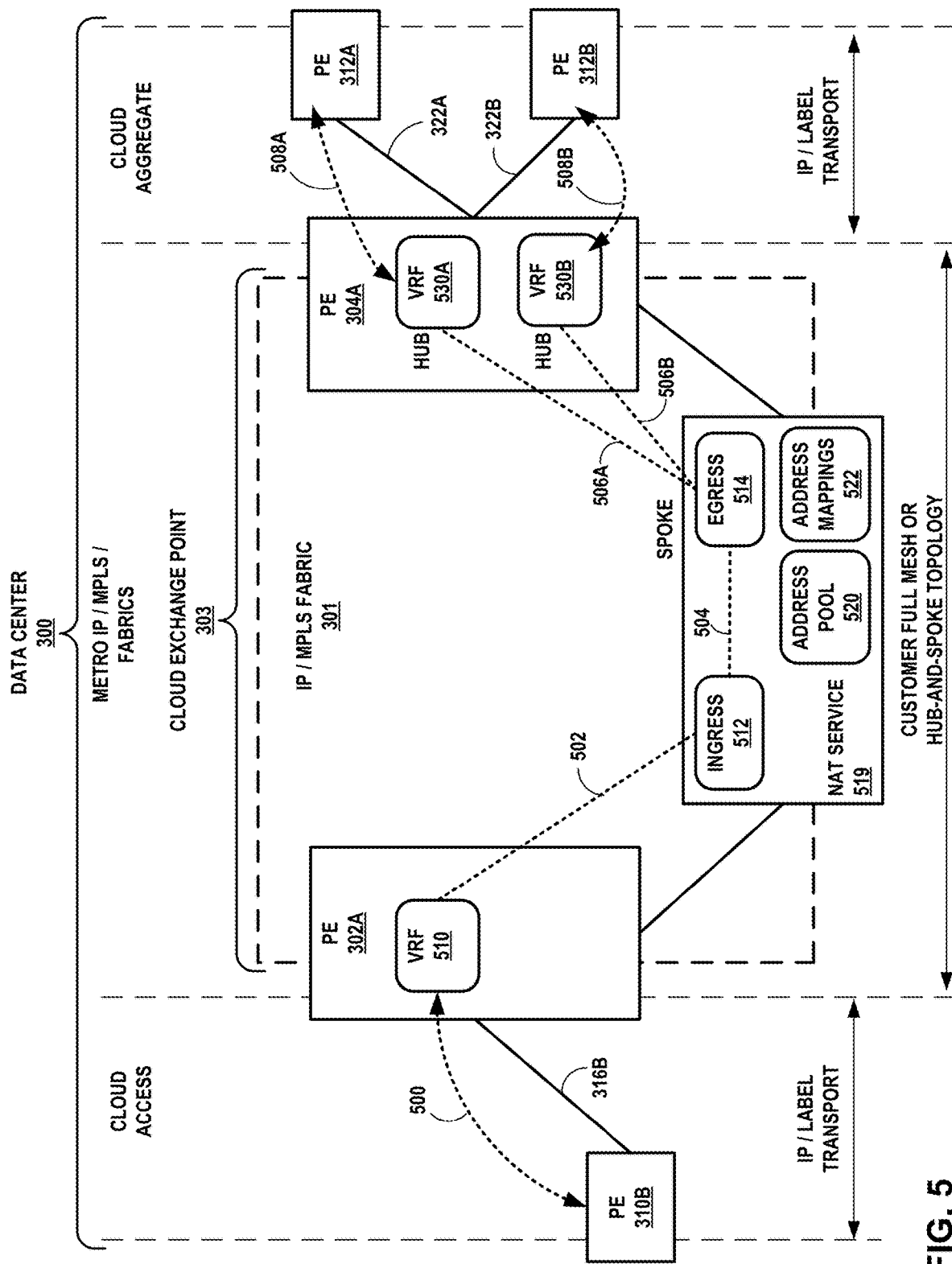
FIG. 5 is a block diagram illustrating an example of a data center-based cloud exchange point in which a cloud exchange point is configured to apply network address translation and to route and forward network traffic from a network service provider to a customer network, according to techniques described herein.

FIG. 5 is a block diagram illustrating an example of a data center-based cloud exchange point in which a cloud exchange point is configured to apply network address translation and to route and forward aggregated service traffic from multiple cloud service provider networks to a customer network, according to techniques described herein.

Cloud service provider networks 320 and customer networks 308 are not shown in FIG. 5 for ease of illustration purposes. In these examples, the data center-based cloud exchange point 303 applies a network address translation (NAT) service 519 to, in part, enforce network address separation between the cloud service layer accessible via cloud aggregation links 322 and the cloud access layer accessible via cloud access links 316.

A cloud exchange point 303 NAT device(s) that applies NAT service 519 performs NAT (or NAPT), which may also or alternatively include carrier-grade NAT ("CG-NAT" or "CGN"), to translate the cloud exchange point 303 addresses and CSP routes and/or to translate the cloud exchange point 303 addresses and customer routes. The cloud exchange point 303 NAT device(s) that applies NAT service 519 (also referred to herein as "NAT service 519 device") may include one or more dedicated NAT appliances, one or more virtual machines executing on real server(s) and configured to apply NAT using network function virtualization (NFV), one or more service cards configured to apply the NAT service 519 and inserted in one or more of PEs 302, 304, or other device(s) inbox or out-of-box.

NAT service 519 of FIG. 5 may be implemented in one or more NAT service devices. In FIG. 5, the NAT service 519 is associated with an address pool 520 that is configured with routes for the cloud exchange point 303 autonomous system and from which the NAT service 519 may draw to automatically provision and map, for NAT purposes, to customer and/or cloud service provider routes received via peering sessions 500 and 508A-508B, respectively. The network addresses for configured routes in address pool 520 (or "NAT pool 520") may be public, private, or a combination thereof, and may represent IPv4 and/or IPv6 routes. In some examples, the network addresses are public in order to provide global uniqueness for the network addresses.

Address mappings 522 may specify one or more NAT mappings and/or network address and port translations (NAPT) that associate routes from address pool 520 for the cloud exchange point 303 with routes received by the cloud exchange point 303 routers from any of PEs 310, 312. Routes received from any of PEs 310, 312 for translation and used in end-to-end service delivery may include any IP addresses/prefixes from enterprise/NSP customers of the cloud exchange provider, such addresses including private and/or public IPv4 and/or IPv6 addresses and received at any one or more of the cloud exchange points managed by the cloud exchange provider.

As noted above, NAT service 519 may perform NAT to translate customer routes for customer network 308B (not shown in FIG. 5) and cloud exchange point 303 routes advertised to PEs 312A, 312B for aggregated cloud access. As a result, CSP networks 320 (not shown in FIG. 5) receive the cloud exchange point 303 routes drawn from address pool 520 instead of the customer routes. The cloud exchange point 303 is thus able to filter customer network information from the CSPs, and the CSPs receive cloud exchange point 303 routes associated with a single autonomous system (i.e., the cloud exchange point 303 and one ASN per cloud exchange point) rather than customer routes (which could potentially number in the millions) associated with multiple different autonomous systems (and corresponding ASNs, which could potentially number in the hundreds) for various customers (enterprises and/or NSPs).

Further, because the cloud exchange point 303 does not advertise its routes other than to customers and CSPs, the cloud exchange point 303 does not announce its routes to the Internet, which may improve security and reduce the potential for Denial of Service (DoS) or other malicious activity directed to the cloud exchange point 303 and customers/CSPs with which the cloud exchange point 303 has peering relationships. In addition, the techniques described above may simplify end-to-end cloud service delivery processing and improve performance by ensuring that local traffic is processed locally (within the cloud exchange point 303).

In the illustrated example, NAT service 519 is associated with ingress service VRF 512 ("ingress 512") and egress service VRF 514 ("egress 514") for attracting service traffic that is associated with customer network 308B and that is to be NATted. Ingress 512 and egress 514 constitute part of a customer service chain for cloud service traffic between customer network 308B and CSP networks 320A, 320B. Customer VRF 510 associated customer network 308B receives routes from customer PE 310B via peering session 500. Customer VRF 510 may be configured in a VPN-full mesh relationship with ingress service VRFs distributed in the cloud exchange point 303 (only one peering session 502 is illustrated, however).

In some examples, PE 302A distributes, for VRF 510, customer routes received via peering session 500 to the NAT service 519, which dynamically maps the customer route prefixes to cloud exchange point route prefixes drawn from address pool 520. The customer routes are installed to ingress service VRF 512. The NAT service 519 installs the mappings to address mappings 522 and installs, to egress service VRF 514, cloud exchange point routes that specify the cloud exchange point route prefixes and NAT service 519 as the next hop. In this way, NAT service 519 and more specifically egress service VRF 514 attracts downstream traffic from CSP network 320 that is intended for the customer network 308B but destined for the cloud exchange point routes installed to egress service VRF 514. Ingress service VRF 512 and egress service VRF 514 may establish peering session 504 and be configured with route targets to cause VRFs 512, 514 to leak routes to one another via iBGP, for instance.

Egress service VRF 514 may operate as a spoke VRF for corresponding hub VRFRs 530A, 530B in a manner similar to VRFs of PE 302A operating as spoke VRFs in the example of FIG. 4. That is, egress service VRF 514 and VRFs 530A, 530B are configured with reciprocal route targets such that egress service VRF 514 advertises routes for the egress service VRF 514 for installation to VRFs 530A, 530B, while VRFs 530A, 530B advertise routes for corresponding CSP networks 320A, 320B to egress service VRF 514. NATted upstream service traffic destined to any of CSP networks 320A, 320B passes through corresponding hub VRFs 530A, 530B. Each of peering sessions 506A, 506B may be used in this way to create hub-and-spoke VPNs for the respective CSP networks 320A, 320B.

PEs 302, 304 may establish tunnels with the NAT service 519 device. Routes exchanged via peering sessions 502 and 506A, 506B may include labeled routes for implementing MPLS/BGP IP-VPNs according to RFC 4364, incorporated above.

Cloud exchange point 303 may forward and apply NAT service 519 to downstream service traffic from PE 312A, intended for customer network 308A, as follows. PE 304A receives a service packet on aggregation link 322A. The packet has a destination address that is a cloud exchange point 303 address drawn from address pool 520. VRF 530A associated with aggregation link 322A stores a route for the destination address that specifies an address for the NAT service 519 device, and PE 304A tunnels the packet using VRF 530A to the NAT service 519 device for application of the NAT service.

NAT service 519 uses address mappings 522 dynamically provisioned for routes for customer network 308A and received from PE 302A to perform NAT and replace the service packet destination address with a destination address in customer network 308A. The NAT service 519 device may determine in ingress service VRF 512 the labeled route to PE 302A (the label identifying VRF 510) and tunnel the modified service packet PE 302A, which may identify VRF 510 from the label attached to the modified service packet. PE 302A forwards the modified service packet to PE 310 via access link 316B. In this way, cloud exchange point 303 provides a NAT service to the customer to separate the customer from the cloud service layer. In a similar way, the cloud exchange point 303 may apply NAT to upstream traffic to separate cloud service providers from the cloud or network access layer by which customer networks access the cloud exchange point.

Figure 6:
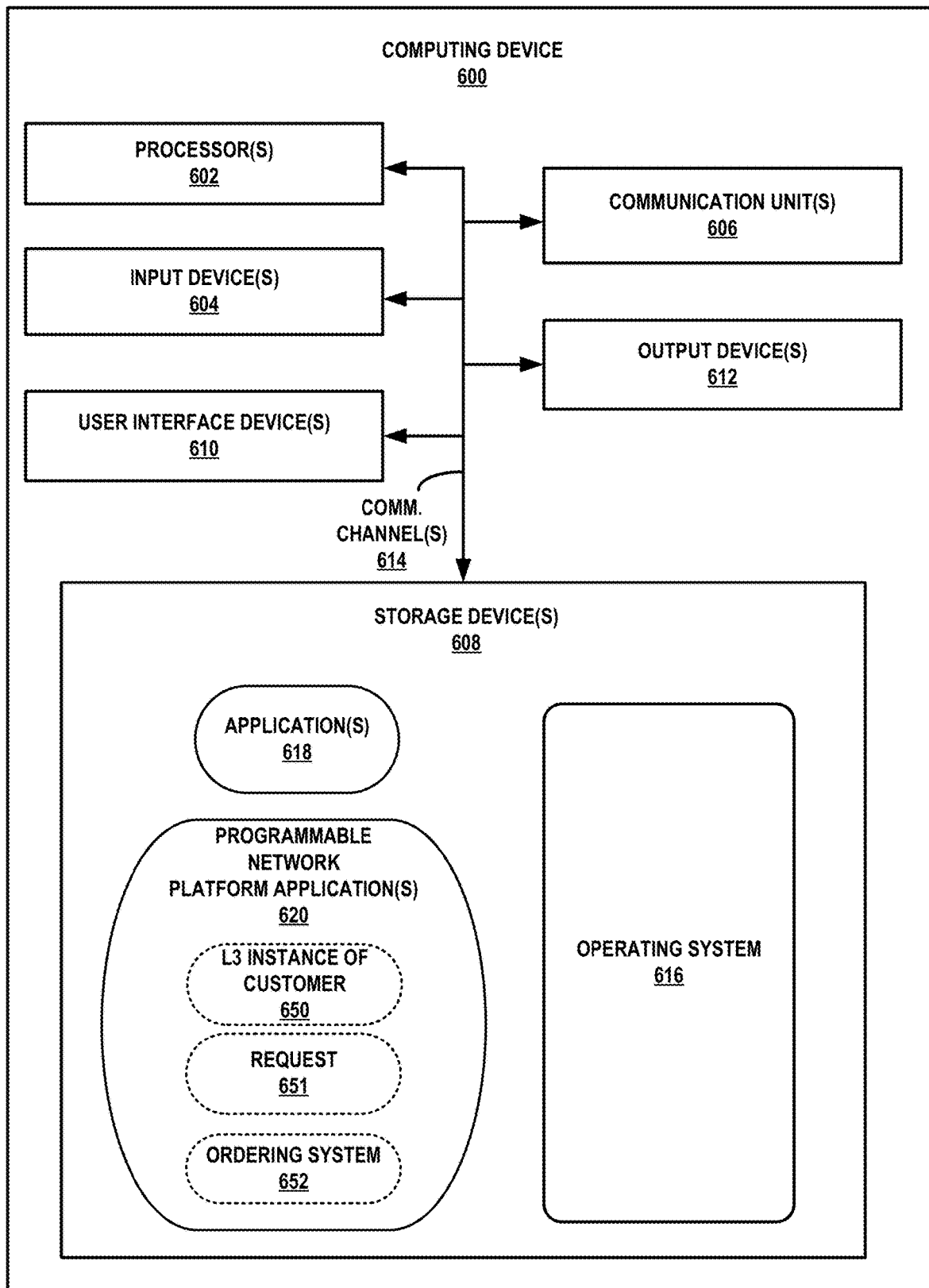
FIG. 6 is a block diagram illustrating further details of one example of a computing device that operates in accordance with one or more techniques of the present disclosure.

FIG. 6 is a block diagram illustrating further details of one example of a computing device that operates in accordance with one or more techniques of the present disclosure. FIG. 6 may illustrate a particular example of a server or other computing device 600 that includes one or more processor (s) 602 for executing any one or more of any system, application, or module described herein. For example, the one or more processor(s) 602 may execute instructions of VNF(s) in NFVI 102 to instantiate and deploy VNFs to NFVi and apply techniques described herein to determine and configure compute resource allocations for VNFs executing on servers of the NFVi 102. As such, computing device 600 may represent an example instance of server 202A or another system for VNFs executing on servers of the NFVi in accordance with techniques of this disclosure. Other examples of computing device 600 may be used in other instances. Although shown in FIG. 6 as a stand-alone computing device 600 for purposes of example, a computing device may be any component or system that includes one or more processors or other suitable computing environment for executing software instructions and, for example, need not necessarily include one or more elements shown in FIG. 6 (e.g., communication units 606; and in some examples components such as storage device(s) 608 may not be co-located or in the same chassis as other components).

As shown in the specific example of FIG. 6, computing device 600 includes one or more processors 602, one or more input devices 604, one or more communication units 606, one or more output devices 612, one or more storage devices 608, and user interface (UI) device 610, and communication unit 606. Computing device 600, in one example, further includes one or more applications 622, programmable network platform application(s) 624, and operating system 616 that are executable by computing device 600. Each of components 602, 604, 606, 608, 610, and 612 are coupled (physically, communicatively, and/or operatively) for inter-component communications. In some examples, communication channels 614 may include a system bus, a network connection, an inter-process communication data structure, or any other method for communicating data. As one example, components 602, 604, 606, 608, 610, and 612 may be coupled by one or more communication channels 614.

Processors 602, in one example, are configured to implement functionality and/or process instructions for execution within computing device 600. For example, processors 602 may be capable of processing instructions stored in storage device 608. Examples of processors 602 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 608 may be configured to store information within computing device 600 during operation. Storage device 608, in some examples, is described as a computer-readable storage medium. In some examples, storage device 608 is a temporary memory, meaning that a primary purpose of storage device 608 is not long-term storage. Storage device 608, in some examples, is described as a volatile memory, meaning that storage device 608 does not maintain stored contents when the computer is turned off. Examples of volatile memories include random access memories (RAM), dynamic random access memories (DRAM), static random access memories (SRAM), and other forms of volatile memories known in the art. In some examples, storage device 608 is used to store program instructions for execution by processors 602. Storage device 608, in one example, is used by software or applications running on computing device 600 to temporarily store information during program execution.

Storage devices 608, in some examples, also include one or more computer-readable storage media. Storage devices 608 may be configured to store larger amounts of information than volatile memory. Storage devices 608 may further be configured for long-term storage of information. In some examples, storage devices 608 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 600, in some examples, also includes one or more communication units 606. Computing device 600, in one example, utilizes communication units 606 to communicate with external devices via one or more networks, such as one or more wired/wireless/mobile networks. Communication units 606 may include a network interface card, such as an Ethernet card, an optical transceiver, a radio frequency transceiver, or any other type of device that can send and receive information. In some examples, computing device 600 uses communication unit 606 to communicate with an external device.

Computing device 600, in one example, also includes one or more user interface devices 610. User interface devices 610, in some examples, are configured to receive input from a user through tactile, audio, or video feedback. Examples of user interface devices(s) 610 include a presence-sensitive display, a mouse, a keyboard, a voice responsive system, video camera, microphone or any other type of device for detecting a command from a user. In some examples, a presence-sensitive display includes a touch-sensitive screen.

One or more output devices 612 may also be included in computing device 600. Output device 612, in some examples, is configured to provide output to a user using tactile, audio, or video stimuli. Output device 612, in one example, includes a presence-sensitive display, a sound card, a video graphics adapter card, or any other type of device for converting a signal into an appropriate form understandable to humans or machines. Additional examples of output device 612 include a speaker, a cathode ray tube (CRT) monitor, a liquid crystal display (LCD), or any other type of device that can generate intelligible output to a user.

Computing device 600 may include operating system 616. Operating system 616, in some examples, controls the operation of components of computing device 600. For example, operating system 616, in one example, facilitates the communication of one or more applications 618 with processors 602, communication unit 606, storage device 608, input device 604, user interface devices 610, and output device 612.

Application(s) 618 and programmable network platform applications 620 may also include program instructions and/or data that are executable by computing device 600. As one example, programmable network platform applications 620 may apply techniques described herein to enable network service provider connectivity for data center customers for a provider of their choosing. A L3 instance 650 stores information corresponding to a customer's external network (e.g., L3VPN). Programmable network platform applications 620 uses L3 instance 650 to assign a virtual port to the customer's network and create a connection to the customer's external network from other virtual networks. Request 651 stores network information describing a desired network service provider for network connectivity (e.g., an Internet connection). Furthermore, programmable network platform applications 620, as an example, may include software such ordering system 651 for services (e.g., interconnection services, network service provider connectivity services, and/or the like) and may operate as illustrated and described herein.

According to one example technique, programmable network platform applications 620 configures a virtual network device in NFVI to run a network service for a data center customer such customer 108A as illustrated in FIG. 2 or customer 108B as illustrated in FIG. 2. The customer desires network connectivity with a provider of their choosing instead of arbitrary choice or one selected by the data center provider. Programmable network platform applications 620 may receive, from the customer, network information 651 for a network service provider corresponding to the network service provider connectivity service and a request for a network service provider connectivity service for the customer. Programmable network platform applications 620 may assign, in response to receiving the request, a remote port of cloud exchange to the virtual network device of the customer. In accordance with the network information, programmable network platform applications 620 may configure the remote port to access to the network service provider; and configure, in performance of the network service provider connectivity service, the cloud exchange to connect, via the remote port, the virtual network device and the network service provider, wherein the virtual network device handles network traffic between the customer and the network service provider.

Figure 7:
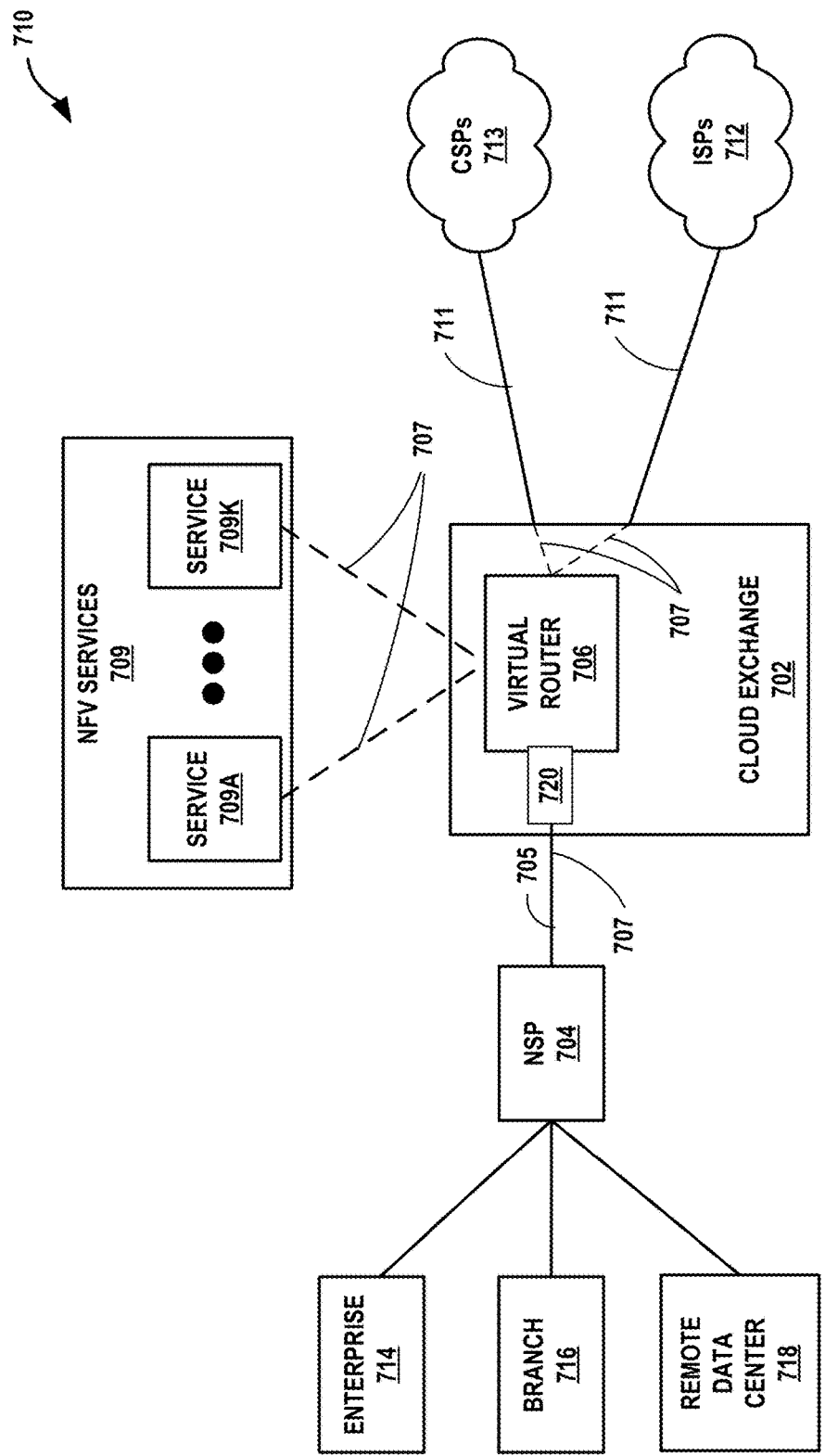
FIG. 7 is a block diagram depicting an example cloud exchange having a remote port to connect customer networks to customer network services, according to techniques of this disclosure.

FIG. 7 is a block diagram depicting cloud exchange 702 having remote port 720 to connect customer networks to customer network services, according to techniques of this disclosure. Remote port 720 may be a virtual NSP port that an entity purchases from a data center provider, becoming a customer of that provider, and employs to direct network traffic through NSP network 704 (or simply NSP 704). Among a plurality of available NSPs for cloud exchange 702, NSP 704 represents a particular network service provider (NSP) with which the entity has a pre-existing agreement for network connectivity services.

A virtual performance hub contrasts with a physical performance hub rack deployed by an enterprise customer to co-location space in a data center. In a physical performance hub deployment, the data center provider offers cross-connection to, e.g., cloud provider networks, a cloud exchange, a network service provider networks, and to enterprise networks (Enterprise HQ 714, enterprise data center 718, and branch offices 716) via the network service provider networks. The performance hub rack includes slots for multiple dedicated network function appliances, including a router, firewall, VPN terminator, load balancer, and WAN acceleration, as the illustrated examples. The enterprise customer must lease co-location space in the data center to deploy the performance hub rack, which is then cross-connected by the data center provider to one or more networks in order to send and receive packet flows to which the performance hub applies the network functions.

System 710 operates according to techniques of this disclosure to provide a virtual performance hub that does not require a customer to lease co-location space from the data center provider, and instead routes packet flows among third-party virtualized network functions that are hosted in one or more cloud service provider networks or hosted by one or more computing devices operated by the data center provider but configurable by, e.g., the customer. System 710 may represent an example instance of system 500 of FIG. 5.

In the illustrated example, a customer of a data center provider, such as an enterprise customer, requests a virtual router from the cloud exchange provider and the customer requests respective virtual circuits from the virtual router to the cloud service provider networks that host NFV services. The cloud exchange provider may provision a cross-connect 705 from an NSP network 704, by which the enterprise networks reach the cloud exchange, to the cloud exchange network and further provision a virtual circuit 707 over the cross-connect 705 to create a virtual connection between the virtual router 706 and the enterprise networks 714. The customer may configure the virtual router 706 to thereafter route packet flows among third-party network function virtualization service providers that offer NFV services 709-709K via virtual connections to cloud exchange 702. In some cases, one or more of the NFV services may be hosted by the cloud exchange provider in the data center that hosts the cloud exchange. The enterprise may lease processing power and bandwidth, e.g., from the cloud exchange provider to execute the NFV services. The NFV service may be configurable by the customer. The virtual router 706 may be used as an integration hub for inter-CSP use cases, service linking, and as a termination point for Internet service. Cross connects may be terminated to the data center network infrastructure (platform) with connection pointed to a specific virtual router. The virtual router 706 may serve as the integration point for virtual connections to third-party NFV service providers.

System 710 may each include a virtual router and one or more virtual ports over a physical cross-connect 709 by which a virtual connection 707 between an NSP network offering connectivity to an enterprise customer and a virtual router in the data center is established. The NSP network may offer WAN connectivity. Via the cloud exchange, the virtual router may route traffic to/from one or more virtualized performance hub servers, the Internet, and one or more other cloud service provider networks 713 offering Infrastructure, Software, Platform, Data Storage, or other offering as-a-Service. At least in some examples, no colocation is required for a customer to obtain NFV services (e.g., firewall, load balancer, packet inspection) using a virtual performance hub. A system may include a virtual router, virtual ports for connecting a virtual circuit (or "interconnection") 707 over an NSP/ECX cross connect between an NSP and the virtual router. The system may offer connectivity for a performance hub/NFV services, a WAN connection, and Internet Service connection (ISP/Internet Connect) 712, and third-party cloud services (IaaS/SaaS).

A virtual router may be configurable by a customer using a user interface to the virtual router. The communication with the virtual router may be via a dedicated management interface for the customer to the virtual router. A virtual router may be deployed using an Infrastructure-aaS option with a virtual router user interface, i.e., the customer may deploy a third-party NFV router selected by the customer, e.g., from a marketplace that may be run by the data center and/or cloud exchange provider. In other words, the cloud exchange provider provides the infrastructure (e.g., processing and bandwidth) for the virtual router. The provider may charge for processing, memory, and bandwidth. The customer may pay for a license and support directly to the NFV router vendor. The provider may provide out of band access for virtual router configuration as well as a minimum configuration. The customer may then manage the device and configuration using management/interface protocols. The out-of-band access may be enabled by a management interface provided by the provider that provides direct configuration access to the virtual router, unmediated by APIs or other interfaces of the data center provider, but at least in some cases directly using the virtual router vendor-supplied interface.

A virtual router may be deployed in using a Software-aaS option with a virtual router user interface, i.e., the customer runs the provider-provided router service. In other words, the provider provides the software as well as the infrastructure for the virtual router. The provider may charge for bandwidth and the virtual router services. The provider may further provide a simplified portal for management of IP addresses, router filters, NAT rules, routing protocols, access control lists, and virtual private networks. The provider may also provide support, but the customer substantially configures the virtual router.

A virtual router may be illustrated as network device 208 in FIG. 2. The virtual router may be deployed to forward, via a remote port such as remote port 210 of FIG. 2, customer network traffic to NSP 704, and, ultimately, to a destination endpoint in a public network or a private network. Examples of the destination endpoint include a user device in the customer's network, an Internet site in a public network, or a cloud service resource of a private network. The virtual router may be configured to route the customer's network traffic (or a portion thereof) to NSP 704 or to CSPs 713 and ISPs 712. The customer may have a pre-existing relationship with NSP 704 and leverage that relationship to determine which data center NSP 704 has a physical presence. The customer may obtain sufficient network information to describe NSP 704 to a cloud exchange in the data center in which NSP 704 has a physical presence. Based on the network information, the cloud exchange assigns the remote port to the virtual router and programs the virtual router to engage in sessions with a particular peer of NSP 704. Because NSP 704 has a physical presence in the same data center, the remote port facilitates a direct interconnection between the virtual router and NSP 704. In this manner, the virtual router routes most (if not all) customer network traffic through NSP 704, enabling the customer to track most (if not all) internal customer network traffic (e.g., traffic between branch offices). Having one network service provider simplifies the customer's network (e.g., in terms of information technology) and benefits the customer with increased security and better performance.

Figure 8:
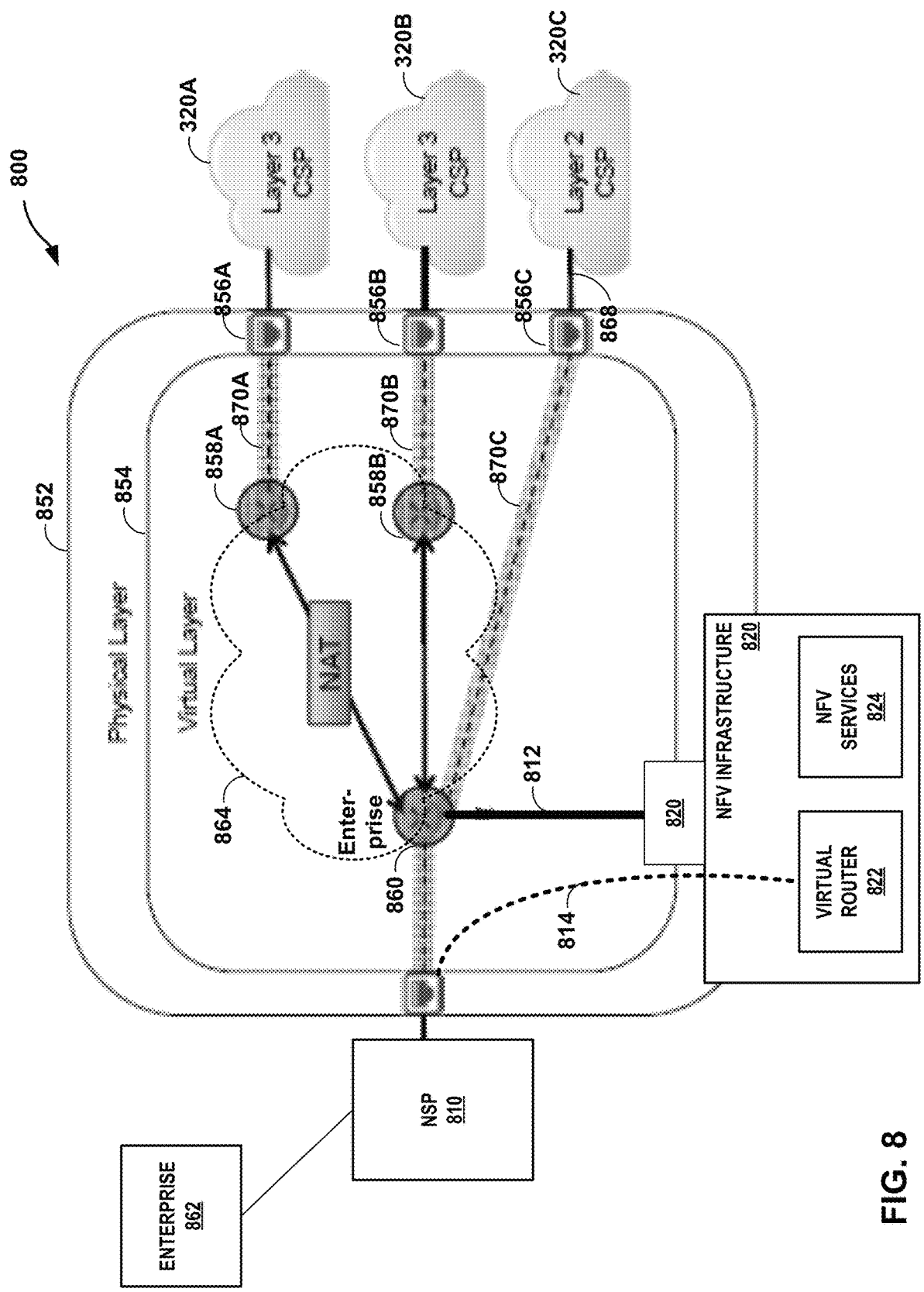
FIG. 8 is a block diagram illustrating a system in which a virtual router routes packet flows among networks using a virtual network layer provided by a data center provider using a remote port, according to the described techniques.

FIG. 8 is a block diagram illustrating a system in which a virtual router routes packet flows among networks using a virtual network layer provided by a data center provider, according to the described techniques. System 800 is similar in some respects to system 710 of FIG. 7 in that a cloud exchange includes a physical layer and a virtual layer that consists in part of customer-specific layer 3 instances for, e.g., multi-network connectivity. System 800 further includes NFV infrastructure (NFVI) 820 of one or more computing devices to execute NFV services including virtual router 822 and other NFV services 824. The one or more computing devices may represent one or more real or virtual servers located in the data center that hosts the physical layer. In some cases, the computing devices may be in another data center or a remote office connected to the physical layer. The physical layer may be referred to herein as a data center network and may include a switch fabric, as described in further detail below.

In general, an NFV implementations include multiple virtualized network functions (VNFs). The cloud exchange provider, for example, may deploy NFVI 820 and other NFVI instances described herein in the form of one or more computing devices to apply, to data traffic traversing a computer network, network services such as firewall, carrier grade network address translation (CG-NAT), performance enhancement proxies for video, transport control protocol (TCP) optimization and header enrichment, caching, and load balancing. Each of these network services may be referred to as a network function and may be performed by a virtualized network function, which may be executed by one or more virtual machines, containers, or other execution environment of the NFV Infrastructure. In this way, virtualized network functions may be executed by servers, switches, storage devices, and cloud computing infrastructure, instead of having custom hardware appliances for each network function. NFVI 820 and other NFVI instances described herein may include computing hardware, storage hardware, and network hardware for executing VNFs. NFVI 820 and other NFVI instances described herein further includes a virtualization layer over the hardware to offer virtual computing, virtual storage, and virtual network for executing VNFs using virtual environments.

A cross-connect 812 between NFV infrastructure 820 and physical layer 852 enables connectivity between NFV infrastructure 820 and networks connected to the physical layer 852. A virtual circuit 814 is provisioned in the virtual layer 854 to create an interconnection between virtual router 822 and a port of physical layer 852 to which NSP network 810 is connected. Enterprise 862 has connectivity to physical layer 852 via NSP 810. As further described herein, system 800 may be configured according to techniques described in this disclosure to provide NFV services within a data center without requiring, at least in some cases, co-location of dedicated NFV appliances within the data center. In this way, virtual router 822 in combination with NFV services 824 provide a virtual performance hub. In some examples, NFV services 824 are hosted by any of CSPs 320.

In some examples, cross-connect 812 represents an interconnection between NSP 810 (a resident of the data center) and remote port 820. A data center customer having enterprise 862 as an external site for a network of devices may employ remote 820 to ensure most (if not all) network traffic is serviced by NSP 810. As one NFV service 824, enterprise 862 and virtual router 822 form a virtual network connecting the customer's network of devices to each other and the data center. Remote port 820 is configured as a virtual port of virtual router 822 and to be reachable on the data center customer's virtual network.

In an example cross-connect 816, to set up the interconnection between remote port 820 and a patch panel of NSP 810, the cloud exchange creates a LOA between the data center customer and the customer's NSP, NSP 810. The LOA cloud exchange may the LOA facilitates an order (e.g., interconnection order) for remote port 820 such that remote port 820 may be configured (e.g., as a virtual port) on the customer's virtual network, which may be a SD-WAN having WAN and LAN sides. The cloud exchange may use a WAN interface to set up a MPLS connection between remote port 820 and enterprise 862. The cloud exchange may populate the LOA with at least some information that was entered into the WAN interface for setting up the MPLS connection.

Figure 9A:
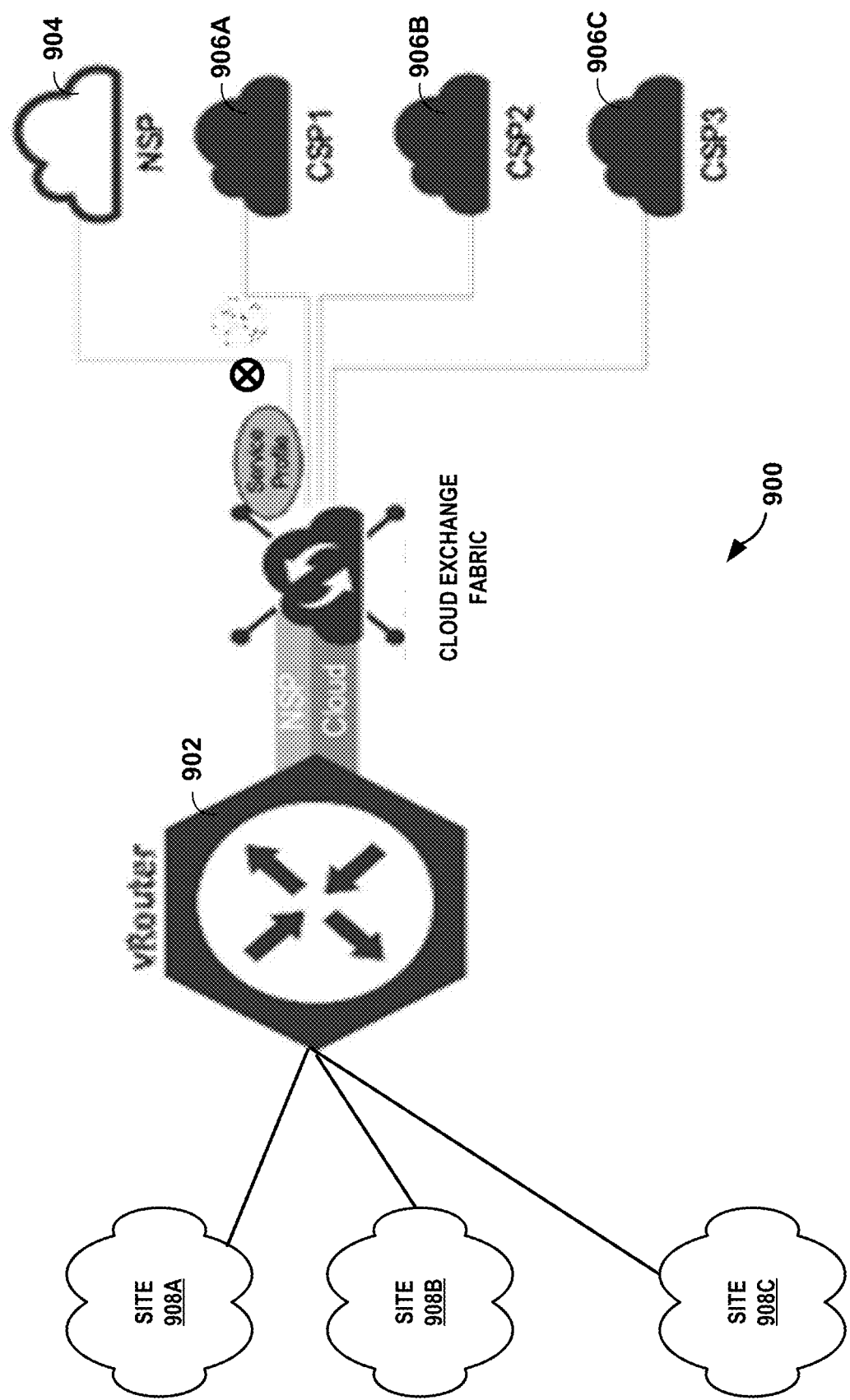
FIGS. 9A-9B are functional block diagrams illustrating high-level views of a network service that is hosted within a data center environment, according to techniques described herein.
Figure 9B:
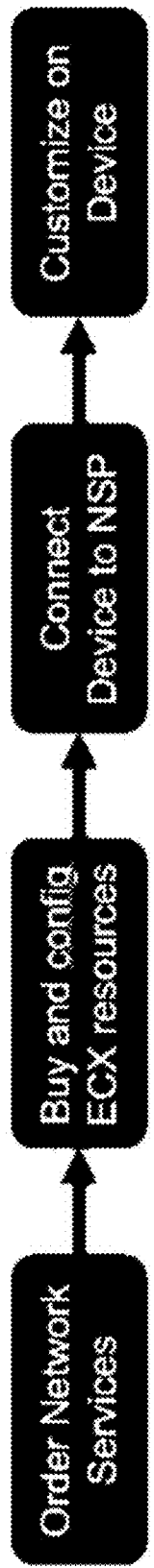
Figure 9B:
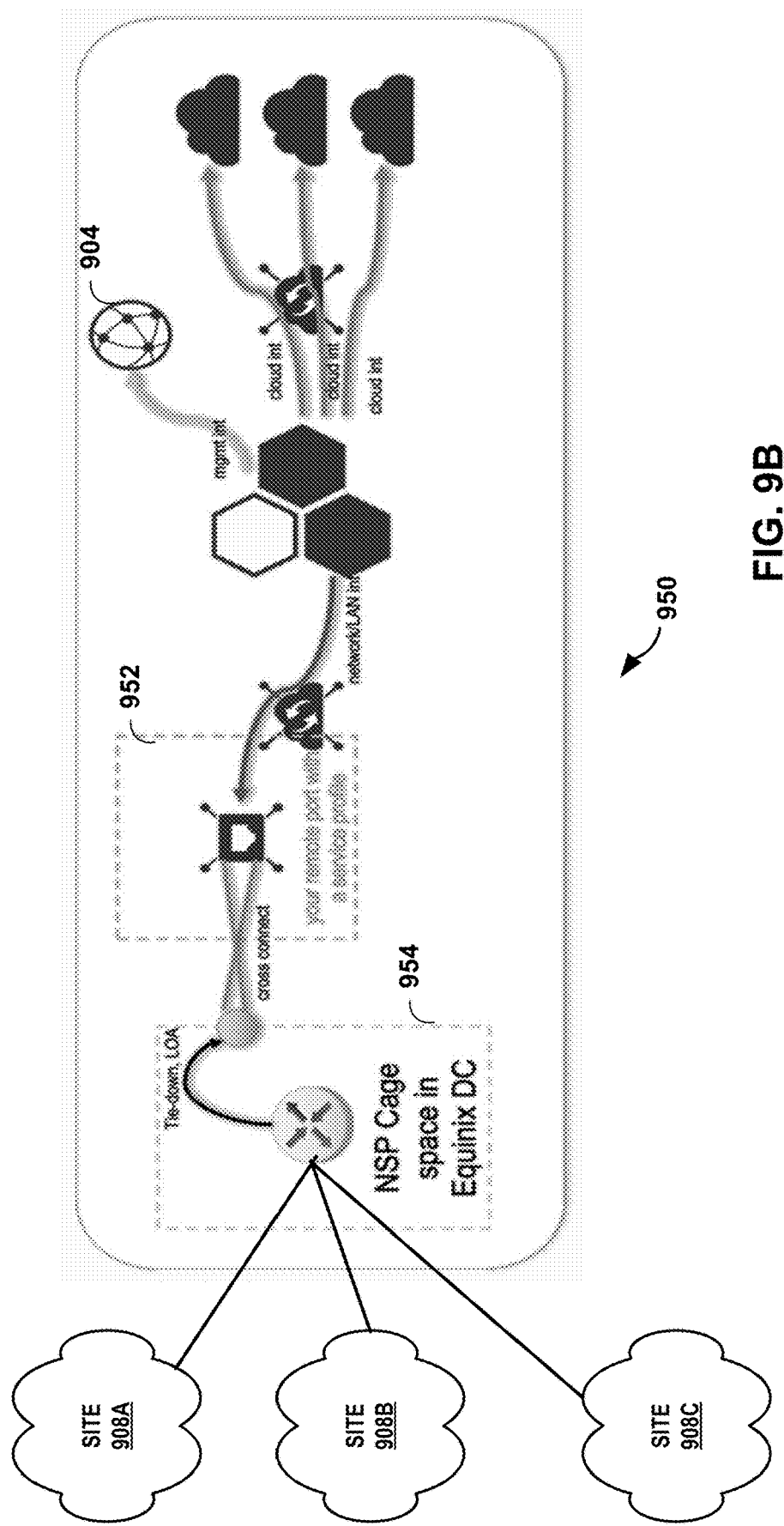

FIGS. 9A-9B are functional block diagrams illustrating high-level views of a network service 900 that is hosted within a data center environment, according to techniques described herein.

As described herein, router 902 (illustrated with label "vRouter" in FIG. 9A) is a virtual network device configured to run network service 900 for a data center customer having multiple (external) sites 908. Each site 908 represents a location housing a sub-network of customer devices. In some examples, the customer desires network connectivity with a provider of their choosing instead of arbitrary choice or one selected by the data center provider. A programmable network platform of a cloud exchange within the data center may receive, from the customer, network information for network service provider 904 corresponding to the network service provider connectivity service and a request for a network service provider connectivity service for the customer. The cloud exchange may assign, in response to receiving the request, remote port 952 of cloud exchange to virtual router 902 of the customer. In accordance with the network information, the cloud exchange may configure remote port 952 to access to network service provider 904. The cloud exchange configures, in performance of the network service provider connectivity service, the cloud exchange to connect, via the remote port, virtual router 902 and cage space 954 for network service provider 904. Virtual router 902 handles network traffic between the customer and the network service provider.

In some examples, sites 908A-C represent three branch offices of a single customer entity. By directing the cloud exchange to configure virtual router 902 with an interconnection, via remote port 952, with NSP 904, the customer behind sites 908A-C benefits from control over network traffic to and from the customer's own branch offices. The customer relies on remote port 952 because that customer does not have an existing outside connection to access this data center via NSP 904 connection/port in that data center. For virtual router 902 to reach that NSP connection/port, the entity requires remote port 952.

In some examples, remote port 952 is a virtual port that has been instantiated and configured on as the customer's virtual network in accordance with the customer's port order with the cloud exchange. In general, the cloud exchange may establish a virtual port as part of a L2/L3 virtual switch/router on an edge of the customer's network. As a result, the cloud exchange configures the virtual port in same cloud exchange point or same virtual network as virtual router 902.

The cloud exchange of FIGS. 9A-B may assign remote port 952 to the virtual router 902 by first, creating the virtual port, second, creating or modifying a service profile for the virtual port, and then, connecting the virtual port to a service profile of a customer. Based on various data provided by the customer—which may include attributes (e.g., size, framing, and/or the like) of a Network Service Provider (NSP) service definition, portions from an associated order form (e.g., a Letter of agreement (LOA)), and other data—the cloud exchange creates/loads the associated order form to complete the port order, creates/loads the virtual port onto a host exchange point or virtual network, and creates an interconnection from the virtual port to NSP 904, which is representative of the provider's network (e.g., virtual network). To create the interconnection, the cloud exchange creates a service profile (e.g., the virtual port's service profile), adds details based on the NSP 904's network, and sets a speed at which data is transmitted via the interconnection. This speed should confirm to NSP 904's design and capabilities and may require operational approval by NSP 904. To complete the network service provider connectivity service per the customer's request, the cloud exchange connects the customer to NSP 904 such that the virtual port becomes remote port 952 of the customer's network by first, creating a virtual connection between the virtual router 902 and the virtual port and then, configuring the virtual port to be part of the network service provided by virtual route 902 (or another virtual network device of the customer). The cloud exchange may further configure the virtual port as a virtual network resource (e.g., VNIC) of virtual router 902.

Through the interconnection, NSP 904 and the customer may exploit their pre-existing relationship and have some or all network traffic (e.g., internal network traffic between customers 308A-C) maintained by the NSP. The cloud exchange may complete the interconnection by instructing that a physical connection be made between the virtual port's location and the NSP 904's physical presence in the same data center (e.g., cage space 954). With this deployment, the customer's port and the customer's provider edge router may be collocated within the same data center.

In addition, the virtual port is instantiated and configured on as the customer's virtual network in accordance with the customer's port order with the cloud exchange. Having a presence on the cloud exchange allows the customer to purchase cloud exchange services (e.g., Equinix CONNECT (ECX) services) and then, designate that port as a destination for accessing such services. In conventional examples, the customer buys NSP access through the cloud exchange but cannot ensure that the NSP is NSP 904. Data centers implementing the techniques described herein enable NSP 904 access, which benefits customers having pre-existing relationships with NSP 904.

In some examples, the cloud exchange loads/creates an order form (e.g., a blank or default order form), and inserts details from configuration data in the customer's service profile. The cloud exchange may generate a modified order form with pre-determined configuration data. The cloud exchange may rely on configuration data within its fabric and user input of any configuration data may be unnecessary to complete the customer's port order. User input in some examples may be used to customize the port order in addition to pre-determined configuration data.

Figure 10:
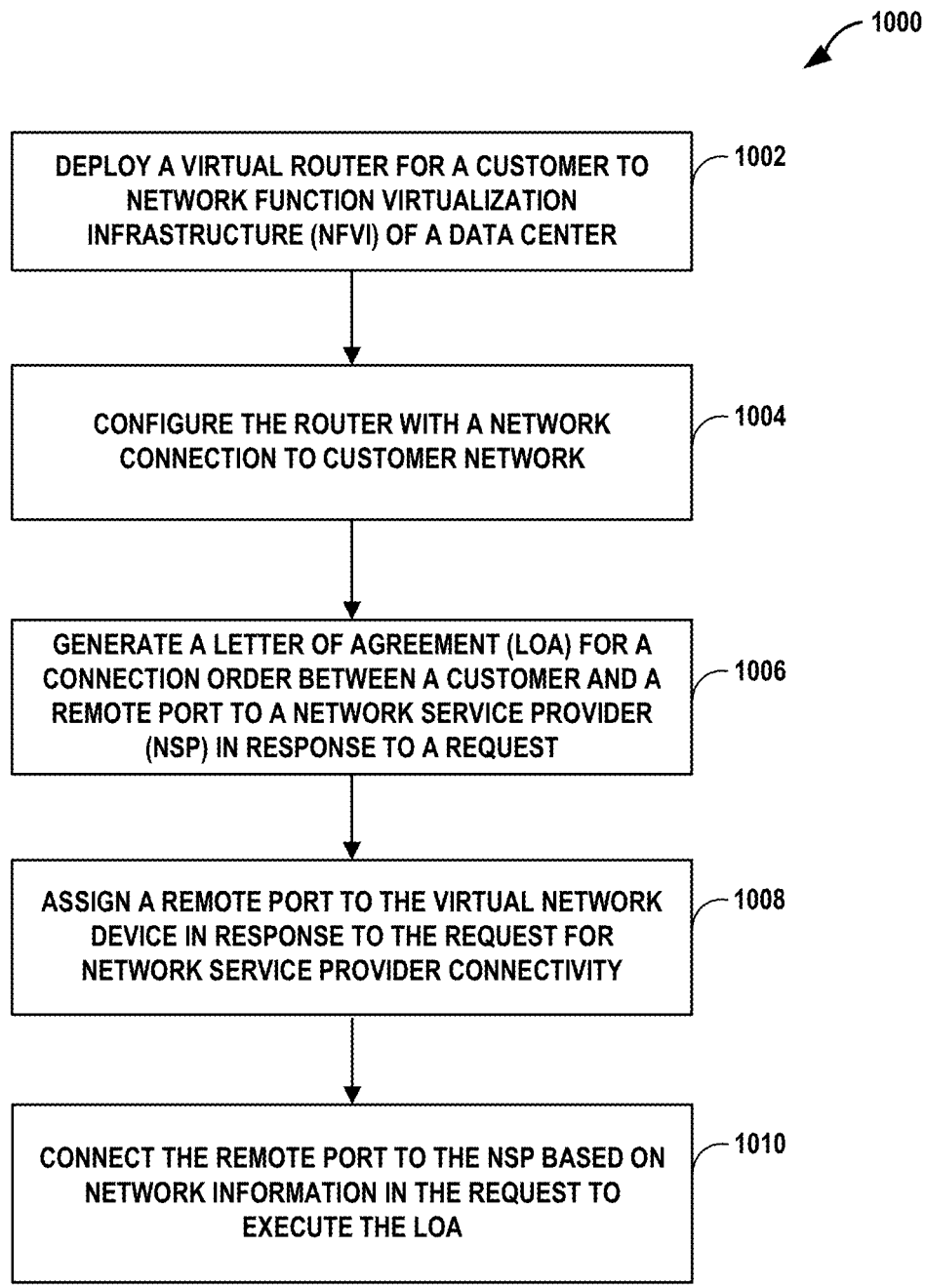
FIG. 10 is a flow diagram illustrating an example mode of operations, according to the described techniques.

FIG. 10 is a flow diagram illustrating example mode of operations to provide a remote port to interconnect a network service provider to a customer network, according to the described techniques. FIG. 10 is a flowchart illustrating of a network service, according to techniques described herein. The following operations are described with respect to programmable network platform 120 of FIG. 1 operating as an example platform component.

Example platform component deploys a virtual router for a customer two network function virtualization infrastructure of a data center (1000). The virtual router is employed by the customer to take advantage of cloud exchange services and network edge services. Example platform component configures the router with a network connection to the customer network (1002).

Example platform component generates a letter of agreement for a connection order between a customer and a remote port to a specific network service provider (NSP) in response to a request from the customer (1004). The remote port is directly connected to the specific NSP's physical presence in the co-located data center. Example platform component assigns the remote port to the virtual router in response to the request for network service provider connectivity (1006). Example platform component connects the remote port to the network service provider based on network information in the request (1008). The remote port may be an access port for a Network Edge NFVI. The cloud exchange may modify a service profile having built-in virtual ports for the remote port. A virtual port is created in the same VXLAN (e.g., in same cloud exchange point) as customer NE device.

Figure 11:
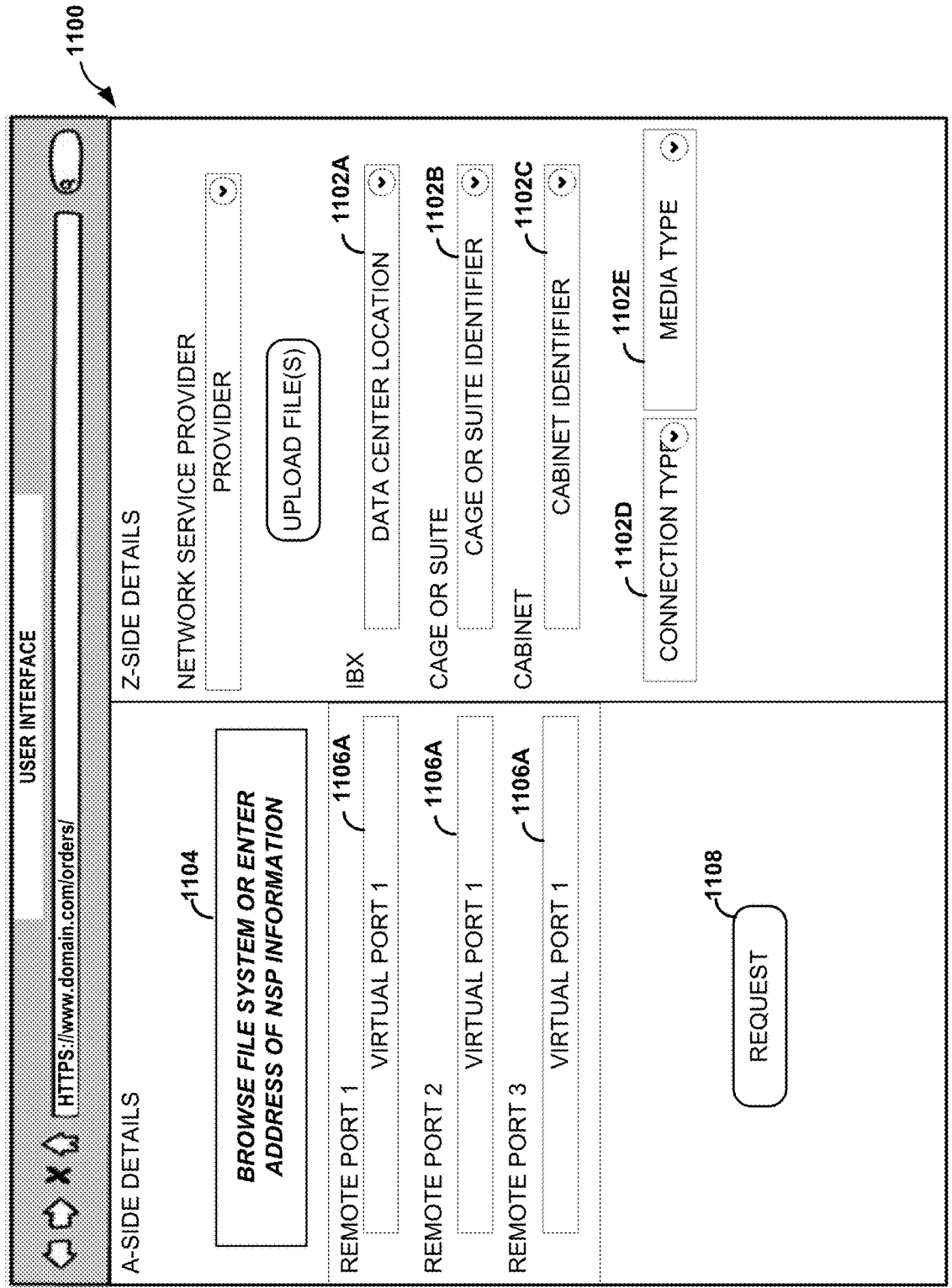
FIG. 11 is an illustration of an example user interface for facilitating connections with a network service provider (NSP), according to the described techniques.

FIG. 11 is an illustration of an example user interface for facilitating connections with a network service provider (NSP), according to the described techniques. Customers use the example user interface for ordering services at a data center.

FIG. 11 is an illustration depicting an example user interface 1100 with which a customer views an order of a NSP remote port and an interconnection within the data center. The interconnection directly connects the remote port to the NSP's physical presence in the data center.

For example, to set up the interconnection between the remote port to a patch panel of the NSP, a platform component of a cloud exchange creates a LOA between the customer and customer's NSP and to facilitate the order such that the remote port may be configured (e.g., as a virtual port) on the customer's virtual network. The customer's virtual network, which is maintained by the cloud exchange, may be a SD-WAN having WAN and LAN sides. Via a WAN interface, a platform component of the cloud exchange may set up a MPLS connection between the remote port and the customer's external network of devices. A platform component of the cloud exchange may populate the LOA with at least of the information entered into the WAN interface for setting up the MPLS connection. By doing so, the cloud exchange enables the customer to use the customer's NSP to handle the customer's network traffic.

With user interface 1100, the customer may initiate the order (e.g., as a A-side customer) while a second customer authorizes the order (e.g., as a Z-side customer). In this manner, the customer controls which NSP to handle network traffic and may leverage an existing relationship. Instead of purchasing a connection to the Internet and/or other external networks and, in some instances, relinquishing control over NSP choice to the data center, the customer may purchase a remote port to direct their network traffic (e.g., internal network traffic between branch offices). Even if the data center (e.g., via a platform such as cloud exchange) provided the customer some control over which NSP services the Internet/Cloud connection, other restrictions (e.g., availability, additional costs, service limitations, and/or the like) inhibit or prevent the customer from having the NSP of their choice.

Example user interface 1100 may be a graphical user interface (GUI) generated by an ordering system as an example platform component of programmable network platform 120 of FIG. 1 or programmable network platform applications 650. In general, a GUI includes a plurality of GUI components of which some GUI components are sub-components of other GUI components. GUI components of example user interface 1100 present content to be used by customers (e.g., both A-side and Z-side customers) for ordering services (e.g., interconnections, NSP connectivity, and/or the like) in the data center managed by a data center provider.

As illustrated, example user interface 1100 includes GUI components 1102A-C that are configured to receive, as input, the set of parameters defining a desired NSP connectivity. GUI components 1102A-E are included in a partition (e.g., a HMTL frame or another container) of example user interface 1100 dedicated to Z-side customer details. GUI components 1102A-E are depicted in FIG. 11 as HTML elements known as drop down boxes, each presenting a list of options for selection as IBX location, cage identifier or suite identifier, and cabinet identifier, connection type or service, and media type. The NSP, the Z-side customer, may communicate any of these parameters to the customer, which is an A-side customer. Via a form field depicted in GUI component 1104, the customer may submit information describing the desired NSP. As an example, the network information may include a set of parameters defining an interconnection within the data center between the remote port and a patch panel for the network service provider. Based on validity of the network information or a response from the network service provider, programmable network platform 120 may output, via user interface 1100, an indication of authorization for the interconnection.

The present disclosure describes a number of example parameters to be used in network information defining the desired NSP connectivity service. In general, the set of parameters include parameter data describing components for physical equipment to be used in, for example, creating a remote port and an interconnection to the NSP's physical equipment in the data center. One type of parameter data identifies a location in the NSP's network (e.g., A-side or Z-side customer network) of a connection point for coupling physical equipment (e.g., a cable) connecting both customers' networks. Parameters for such a location may include identifiers for any combination of a data center, a cage or suite, a cabinet, a patch panel, a physical port, and/or the like. Another parameter may identify a network service and/or a virtual network (e.g., VLAN) maintained by the data center, via cloud exchange, on behalf and for benefit of the NSP. Yet another parameter may identify the remote port as a virtual port of the customer's edge router. Another type of parameter data specifies the components of the physical component (e.g., a connection type, a form factor, and/or the like). Other types of parameters identify various resources to be used as components in the interconnection. A number of other parameters are envisioned by the present disclosure.

As illustrated, example user interface 1100 further includes GUI components 1106A-C, each presenting a form field into which an unique identifier for a remote port is entered. GUI component 1108 is a button that when activated, submits a request with the entered network information. The remote port may be an access port for a Network Edge NFVI. GUI components 1106A-C may represent a portion of a service profile having built-in virtual ports for the remote port. Virtual ports may be part of a VLAN or VxLAN setup on the remote port with the customer's network edge device.

FIGS. 12A-E depict an example workflow for requesting a network service provider (NSP) connectivity service from a cloud exchange of a data center of the present disclosure, according to the described techniques.

Figure 12A:
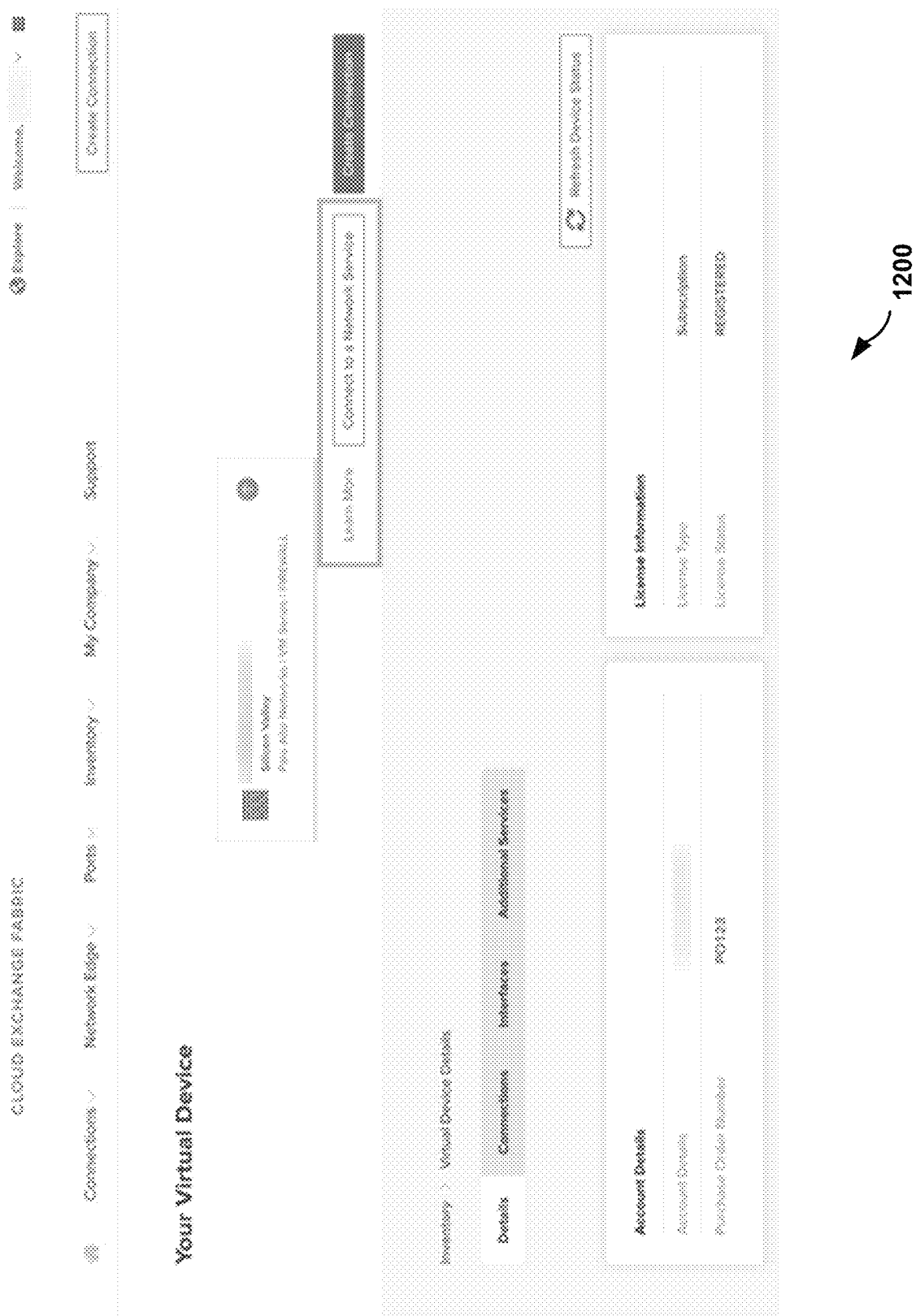
FIGS. 12A-E depict an example workflow for requesting a network service provider (NSP) connectivity service from a cloud exchange of a data center of the present disclosure, according to the described techniques.

FIG. 12A is an illustration of a user interface 1200 depicting details of a network service that a customer has ordered and the cloud exchange has provided. Represents a starting point for the example workflow, user interface 1200 enables customer initiation of the NSP connectivity service. As illustrated, user interface 1200 includes a GUI component that the customer may activate to request the NSP connectivity service. The GUI component may a button with text indicating "Connect to a Network Service."

Figure 12B:
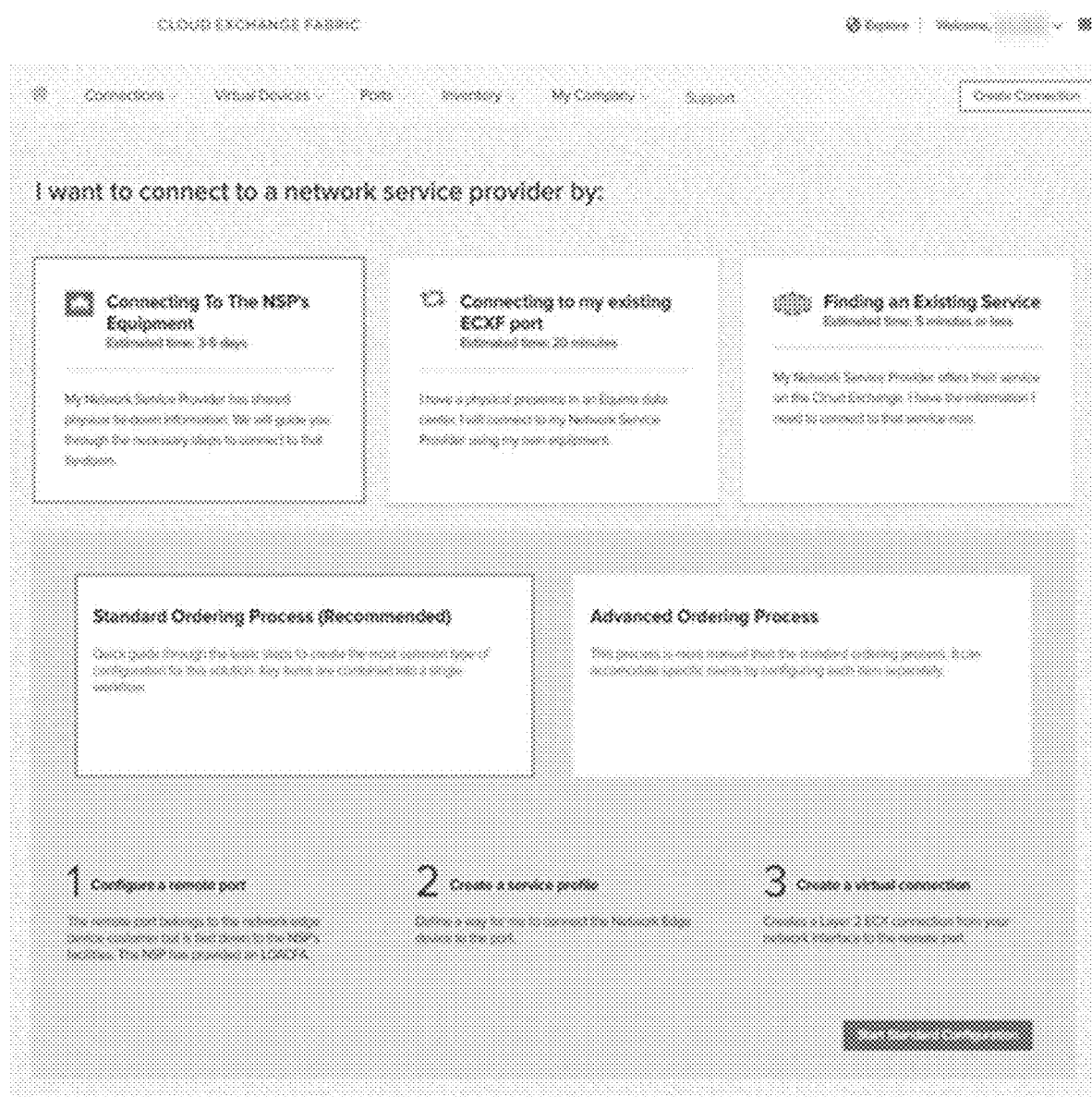

FIG. 12B is an illustration of a user interface 1220 representing a next phase of the example workflow for requesting the NSP connectivity service. After selecting the GUI component of user interface 1200, the cloud exchange generates user interface 1220 to present different options for executing the NSP connectivity service. On user interface 1220, the customer selects a GUI component configured for "connecting to that NSP's equipment." User interface 1220 also includes a GUI component configured to initiate a "Standard Ordering Process" for a remote port. As described herein, the remote port is on the customer's virtual network and on a virtual path between the customer's external network and the customer's virtual network device (e.g., virtual router). The customer's network traffic follows a virtual path from the external network, through the NSP of their choice, and ultimately to the virtual network device.

Figure 12C:
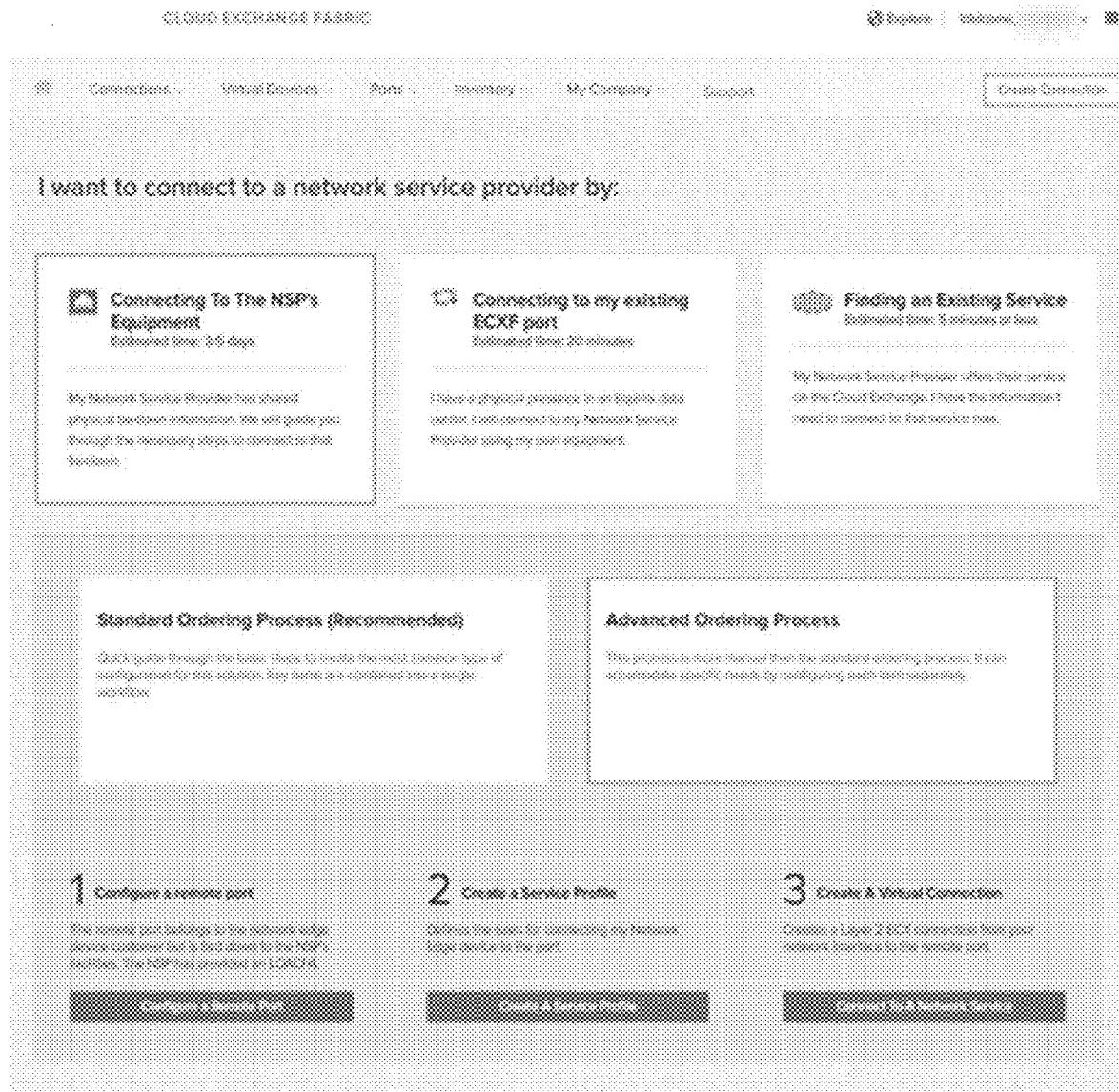

FIG. 12C is an illustration of a user interface 1240 that depicts the customer's selection of a GUI component configured to initiate a "Advanced Ordering Process" for the remote port.

Figure 12D:
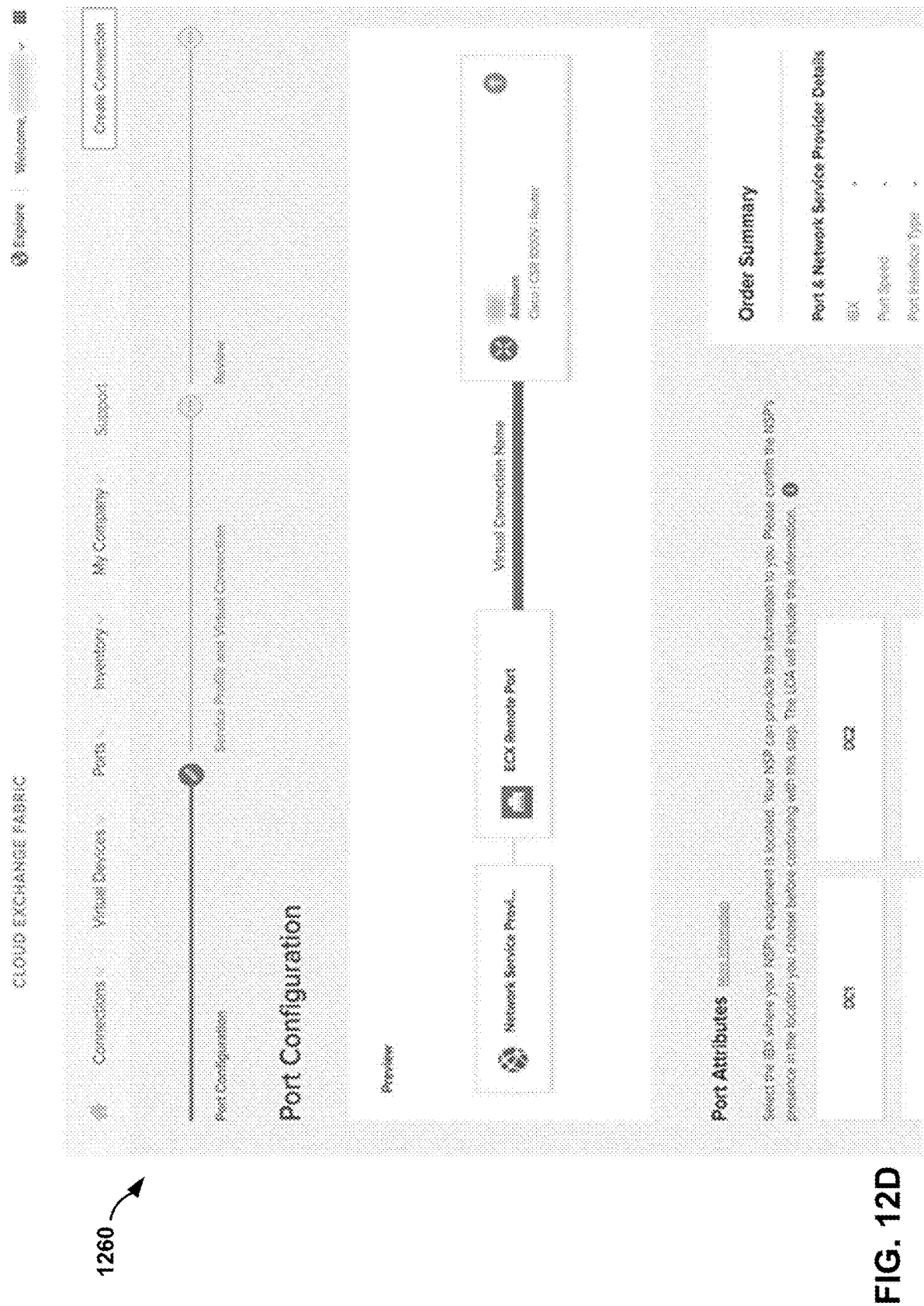

FIG. 12D is an illustration of a user interface 1260 representing a next phase in the example workflow. On user interface 1260, GUI components depict various information for configuring the remote port to be a NSP port for a NSP connectivity. The depicted information includes a virtual port definition for the remote port.

Figure 12E:

FIG. 12E is an illustration of a user interface 1280 representing a final phase in the example workflow. Through user interface 1280, a Letter of Agreement (LOA) is uploaded to provided details of the NSP selected by the customer for handling their (internal) network traffic.

Embodiments of the subject matter described in this specification can be implemented in a computing system that includes a back end component, e.g., as a data center, a middleware component, e.g., an application server, and a front end component, e.g., a client computer having a graphical user interface or a Web browser through which a user can interact with an implementation of the subject matter described in this specification, or any combination of one or more such back end, middleware, or front end components.

The term automated, as used herein, may include performance by a computer or machine without user intervention; for example, by instructions responsive to a predicate action by the computer or machine or other initiation mechanism.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A programmable network platform for a cloud exchange operating within a data center of a data center provider, the programmable network platform comprising processing circuitry configured to:
    configure a virtual network device in the data center to run a network service for a customer;
    receive, from the customer, a request for a remote port and network information for a network service provider connectivity service for the customer;
    assign, in response to receiving the request for the remote port, a remote port of the cloud exchange to the virtual network device, wherein the remote port is a network port of the cloud exchange; and
    configure, in response to receiving the request for the remote port using the network information, the cloud exchange to connect the network service provider connectivity service to the virtual network device via the remote port of the cloud exchange.

2. The programmable network platform of claim 1, wherein to receive, from the customer, the request for the network service provider connectivity service, the processing circuitry is further configured to: receive, from the customer, order information comprising a set of parameters defining an interconnection within the data center between the remote port and a patch panel for a network service provider.

3. The programmable network platform of claim 2, wherein the processing circuitry is further configured to: based on validity of the network information or a response from the network service provider, output an indication of authorization for the interconnection.

4. The programmable network platform of claim 1, wherein the network service provider connectivity service provides connectivity to customer networks of the customer located external to the data center.

5. The programmable network platform of claim 1, wherein to assign the remote port to the virtual network device, the processing circuitry is further configured to: modify a service profile for the customer to instantiate the remote port.

6. The programmable network platform of claim 5, wherein to modify the service profile, the processing circuitry is further configured to: modify the service profile to configure a virtual port in same cloud exchange point or same virtual network as the virtual network device.

7. The programmable network platform of claim 1, wherein the network service provider connectivity service corresponds to at least one of VPLS, VPN, or L3VPN.

8. The programmable network platform of claim 1, wherein to configure the virtual network device to run the network service, the processing circuitry is further configured to: configure network functions virtualization infrastructure (NFVI) to run an interface between the customer and a network service provider.

9. The programmable network platform of claim 1, wherein to configure the cloud exchange, the processing circuitry is further configured to: configure the remote port as an access port for the customer to a network service provider.

10. The programmable network platform of claim 1, wherein to configure the cloud exchange, the processing circuitry is further configured to: connect, via the remote port, the customer to one or more cloud services.

11. The programmable network platform of claim 1, wherein to configure the cloud exchange, the processing circuitry is further configured to: configure a connection between the virtual network device and a device of a network service provider.

12. A method performed by a programmable network platform for a cloud exchange operating within a data center of a data center provider, the method comprising:
    configuring, by processing circuitry, a virtual network device in the data center to run a network service for a customer;
    from the customer, receiving, by the processing circuitry, a request for a network service provider connectivity service, the request comprising network information for a network service provider corresponding to the network service provider connectivity service;
    in response to receiving the request, assigning, by the processing circuitry, a remote port of the cloud exchange to the virtual network device, wherein the remote port is a network port of the cloud exchange; and
    in response to receiving the request for the remote port using the network information, configuring, by the processing circuitry, the cloud exchange to connect the network service provider connectivity service to the virtual network device via the remote port of the cloud exchange.

13. The method of claim 12, wherein configuring the cloud exchange further comprises: configuring, in the data center, an interconnection between the remote port and a patch panel for the network service provider, wherein the network service provider is co-located with the virtual network device via the remote port.

14. The method of claim 12, wherein configuring the cloud exchange further comprises: based on the network information, executing order information comprising a set of parameters defining an interconnection within the data center between the remote port and a patch panel for the network service provider, wherein a customer network and the network service provider are co-located in the data center.

15. The method of claim 14, wherein configuring the cloud exchange further comprises: based on validity of the network information or a response from the network service provider, outputting an indication of authorization for the interconnection.

16. The method of claim 12, wherein configuring the cloud exchange further comprises: configuring the remote port as an access port for the customer to the network service provider.

17. The method of claim 12, wherein configuring the cloud exchange further comprises: connecting, via the remote port, the customer to one or more cloud services.

18. The method of claim 12, wherein to configure the cloud exchange, the processing circuitry is further configured to: configuring a connection between the virtual network device and a device of the network service provider.

19. A non-transitory computer-readable medium comprising executable instructions, that when executed by processing circuitry, cause a computing device to:

configure a virtual network device in a data center to run a network service for a customer;

from the customer, receive a request for a network service provider connectivity service, the request comprising network information for a network service provider corresponding to the network service provider connectivity service;

in response to receiving the request, assign a remote port of a cloud exchange to the virtual network device, wherein the remote port is a network port of the cloud exchange; and in response to receiving the request for the remote port using the network information, configure the cloud exchange to connect the network service provider connectivity service to the virtual network device via the remote port of the cloud exchange.

20. The computer-readable medium of claim 19, wherein the network service provider connectivity service provides connectivity to customer networks of the customer located external to the data center.

\* \* \* \* \*